United States Patent [19]
Higurashi et al.

[11] Patent Number: 6,108,148
[45] Date of Patent: Aug. 22, 2000

[54] METHOD, DEVICE, AND MEDIUM FOR RECORDING DIGITAL SIGNAL

[75] Inventors: Seiji Higurashi, Fuchu; Takeo Ohishi; Mitsuo Harumatsu, both of Yokohama, all of Japan

[73] Assignee: Victor Company of Japan, Ltd., Yokohama, Japan

[21] Appl. No.: 08/913,998

[22] PCT Filed: Mar. 27, 1996

[86] PCT No.: PCT/JP96/00792

§ 371 Date: Sep. 29, 1997

§ 102(e) Date: Sep. 29, 1997

[87] PCT Pub. No.: WO96/31053

PCT Pub. Date: Oct. 3, 1996

[30] Foreign Application Priority Data

Mar. 28, 1995 [JP] Japan .................................. 7-096178
Mar. 31, 1995 [JP] Japan .................................. 7-099719

[51] Int. Cl.[7] .................................................... G11B 5/02
[52] U.S. Cl. ......................... 360/18; 360/22; 360/73.08; 386/80; 386/81
[58] Field of Search .................................. 360/8, 18, 20, 360/22, 27, 73.08; 386/68, 77, 78, 79, 80, 81, 109, 112

[56] References Cited

U.S. PATENT DOCUMENTS

| | | | |
|---|---|---|---|
| 5,583,650 | 12/1996 | Lane et al. | ................. 386/81 |
| 5,734,783 | 3/1998 | Shimoda et al. | ............. 386/81 X |
| 5,751,890 | 5/1998 | Yamasaki et al. | ............ 386/80 |
| 5,953,486 | 9/1999 | Hamamoto et al. | ........... 386/68 |

FOREIGN PATENT DOCUMENTS

| | | |
|---|---|---|
| 0606857 | 7/1994 | European Pat. Off. . |
| 5282801 | 10/1993 | Japan . |
| 6261278 | 9/1994 | Japan . |
| 6284378 | 10/1994 | Japan . |
| 7222094 | 8/1995 | Japan . |

OTHER PUBLICATIONS

IEEE Transactions On Consumer Electronics, vol. 40, No. 3, Azadegan et al, "Data –Placement...", pp. 94–95, Aug. 1994.

*Primary Examiner*—Andrew L. Sniezek
*Attorney, Agent, or Firm*—Jacobson, Price, Holman & Stern, PLLC

[57] ABSTRACT

A digital signal recording and reproducing method and apparatus that record and reproduce sequentially a normal reproducing digital signal and a multiple kind special reproducing digital signal on and from a tape-like recording medium. The data rate of the normal reproducing digital signal is detected. According to the detected data rate, either of the normal reproducing digital signal or special reproducing digital signal is selected. The selected digital signal is recorded at the predetermined location on a recording medium for recording the special reproducing digital signal. The sequentially recorded digital signal is reproduced, and each reproduced signal is detected either the normal reproducing digital signal or the multiple kind special reproducing digital signal. The digital signal detected as either of the digital signals is outputted separately. A tape-like recording medium having a track pattern having a plurality of tracks on which a normal reproducing digital signal and a multiple kind special reproducing digital signal are recorded sequentially. The track pattern provides a first area recording information showing the predetermined location at which the multiple kind special reproducing digital signal is to be recorded, and a plurality of second areas that are locations shown by information and record either of said normal reproducing digital signal or special reproducing digital signal is selected and recorded, according to the data rate of the normal reproducing digital signal.

33 Claims, 16 Drawing Sheets

METHOD, DEVICE, AND MEDIUM FOR RECORDING DIGITAL SIGNAL

TECHNICAL FIELD

The invention relates to a digital signal recording method, and recording apparatus and recording medium thereof, and more particularly, to a method for recording a digital signal on a tape-like recording medium by a rotating head, and its recording apparatus and recording medium.

BACKGROUND ART

In general, when a digital signal is recorded on and reproduced from a tape-like recording medium such as a magnetic tape by a rotating head, the digital signal is recorded and reproduced in data blocks. On the other hand, at trick play reproduction (special reproduction) that reproduces a digital signal at a speed different from that of recording, a rotating head scanning track on a tape-like recording medium unlike at normal reproduction, traverses diagonally a recording track, reproduces in data blocks only a track existing recording signal recorded by a rotating head with the same azimuth angle as a reproducing rotating head; therefore, head output viewed with a time axis is reproduced in burst form at regular intervals, making it difficult to obtain a trick play reproducing signal.

For this reason, a digital signal recording method that permits trick play reproduction is known, by converting a trick play reproducing digital signal into a normal reproducing digital signal to locate and record on a rotating head scanning track at trick play reproduction, on a track on which a normal reproducing digital signal is conventionally recorded (e.g. Japanese Patent Laid-Open No. 261278/1994: Title of the Invention "A Signal Recording and Reproducing Apparatus").

However, cumulation of the amount of data recorded on the tape-like recording medium is fixed in the above conventional digital signal recording method; therefore, to record a trick play reproducing digital signal (also hereinafter called special reproducing data), reserving a constant amount of area forces the rest to be a data area for recording and reproducing a normal reproducing digital signal (also hereinafter called normal reproducing data).

The recorded amount of special reproducing data is fixed in the above conventional digital signal recording method; therefore, when a normal reproducing data transmission rate which is different depending on the contents of information, broadcasting system and so on, is high, the fixed recorded amount of special reproducing data restricts recording of the essentially necessary amount of normal reproducing data.

Further, FIG. 1 shows an example of a track pattern for fast reproduction as trick play. In the same diagram, the diagonally shaded portions on main data areas are fast-reproducing digital signal (fast-reproducing data) recording portions; and the other blank portions are normal reproducing digital signal (normal reproducing data) recording portions. As shown in the same diagram, this track pattern shows a pattern where 6-fold speed fast-reproducing data is located in two areas within each track recorded by a rotating head with the same azimuth angle; and the same data is multiplexed and recorded six times in tracks recorded horizontally by a rotating head with the same azimuth angle.

Use of phase control in two tracks at reproduction for a magnetic tape with this track pattern, to start a head trace in relation to a constant phase for a given track on which fast-reproducing data is recorded, can reproduce all necessary data, even if head scanning is started with any track (this recording and reproducing method is called "phase lock").

Also this track pattern can reproduce these fast-reproducing data at an approximately 1- to 2-fold speed, and 3- to 4-fold speed. In this case, the reproducing rate in n-fold speed (n<6) is n/6 for a 6-fold speed reproducing rate. FIG. 1 represents a 3-fold speed head scanning track as 3x; and a 6-fold speed head scanning track as 6x.

The above conventional digital signal recording and reproducing method, locating the same special reproducing data repeatedly, has no good recording efficiency. In addition, because a relatively many fast-reproducing data record areas are needed, the sufficient number of normal reproducing data record areas cannot be obtained on a magnetic tape with the limited amount of recorded data. This causes a problem, especially for recording a low bit rate application in a slow tape mode such as a long-time mode, occurring in circumstances when normal reproducing data areas must be reserved to some extent, even though a fast-reproducing data areas occupy a physically constant percentage on the magnetic tape.

A conventional method is also known in such a way that a head trace start track is determined in some way; e.g. a 6-fold speed fast-reproducing data is located and recorded on one head scanning track at the speed rate; a head trace is started in relation to one particular phase through reproducing phase control; and head scanning is begun from the determined track to reproduce 6-fold speed data (this recording and reproducing method is called "track select").

Since this recording and reproducing method does not record doubly the same fast-reproducing data, it has good record efficiency and minimizes the number of fast-reproducing data record areas; therefore, many normal reproducing data record areas can be obtained on a magnetic tape with the limited amount of recorded data. However, there is a problem that it takes long time to start fast reproduction, because all necessary data cannot be recorded, unless the head scanning is started from the determined track.

An object of the invention in view of the above points, is to offer a digital signal recording method and recording apparatus that can record the necessary amount of normal reproducing data as well as normal reproducing data and special reproducing data on a tape-like recording medium with an efficient sharing against all data areas, and further a recording medium recorded with this recording method.

Another object of the invention is to offer a digital signal recording method and recording apparatus that can reserve the necessarily minimized number of normal reproducing data areas to start quickly fast reproduction, by controlling variably fast-reproducing data record areas according to the data rate of normal reproducing data, and further a recording medium recorded with this recording method.

DISCLOSURE OF THE INVENTION

To achieve the above purposes according to the invention, a digital signal recording method wherein a normal reproducing digital signal and a multiple kind special reproducing digital signal are recorded sequentially on a tape-like recording medium, comprises the steps of: detecting the data rate of said normal reproducing digital signal, selecting, according to said data rate, either of said normal reproducing digital signal or said special reproducing digital signal, and recording said selected digital signal at the predetermined location on said tape-like recording medium for recording said special reproducing digital signal.

Further according to the invention, a digital signal recording and reproducing method wherein a normal reproducing digital signal and a multiple kind special reproducing digital signal are recorded and reproduced sequentially on a tape-like recording medium, comprises the steps of: detecting the data rate of said normal reproducing digital signal, selecting, according to said data rate, either of said normal reproducing digital signal or said special reproducing digital signal, recording said selected digital signal at the predetermined location on said tape-like recording medium for recording said special reproducing digital signal, reproducing said sequentially recorded digital signal, detecting each said reproduced digital signal is either said normal reproducing digital signal or said multiple kind special reproducing digital signal, and outputting separately the digital signal detected as either of said digital signals.

Yet according to the invention, a digital signal recording apparatus wherein a normal reproducing digital signal and a multiple kind special reproducing digital signal are recorded sequentially on a tape-like recording medium, comprises: detecting means for detecting the data rate of said normal reproducing digital signal, selecting means for selecting, according to said data rate, either of said normal reproducing digital signal or said special reproducing digital signal, and recording means for recording said selected digital signal at the predetermined location on said tape-like recording medium for recording said special reproducing digital signal.

Still according to the invention, a digital signal recording and reproducing apparatus wherein a normal reproducing digital signal and a multiple kind special reproducing digital signal are sequentially recorded on and reproduced from a tape-like recording medium, comprises: detecting means for detecting the data rate of said normal reproducing digital signal, selecting means for selecting, according to said data rate, either of said normal reproducing digital signal or said special reproducing digital signal, recording means for recording said selected digital signal at the predetermined location on said tape-like recording medium for recording said special reproducing digital signal, reproducing means for reproducing said sequentially recorded digital signal, detecting means for detecting each said reproduced digital signal is either said normal reproducing digital signal or said multiple kind special reproducing digital signal, and outputting means for outputting separately the digital signal detected as either of said digital signals.

Furthermore according to the invention, a tape-like recording medium having a track pattern comprising a plurality of tracks wherein a normal reproducing digital signal and a multiple kind special reproducing digital signal are recorded sequentially, said track pattern providing a first area wherein information showing the predetermined location at which said multiple kind special reproducing digital signal is to be recorded is recorded, and a plurality of second areas wherein either of said normal reproducing digital signal or said special reproducing digital signal is selected and recorded, according to the data rate of said normal reproducing digital signal.

BEST EMBODIMENTS OF THE INVENTION

Then, the embodiments of the invention are explained with reference to the drawings.

A digital signal recorded in each embodiment is recorded on a track formed by a helical scanning system magnetic recording and reproducing apparatus (VTR) that records and reproduces the signal on a magnetic tape wound diagonally over an approximately 180-degree angle range on the outer side of a rotator and run at a constant speed, by two rotating heads opposed 180 degrees on the rotator and of different azimuth angles. Each track is formed by arranging more than one constant data area called sync block equivalent to said data block.

Figure 1:
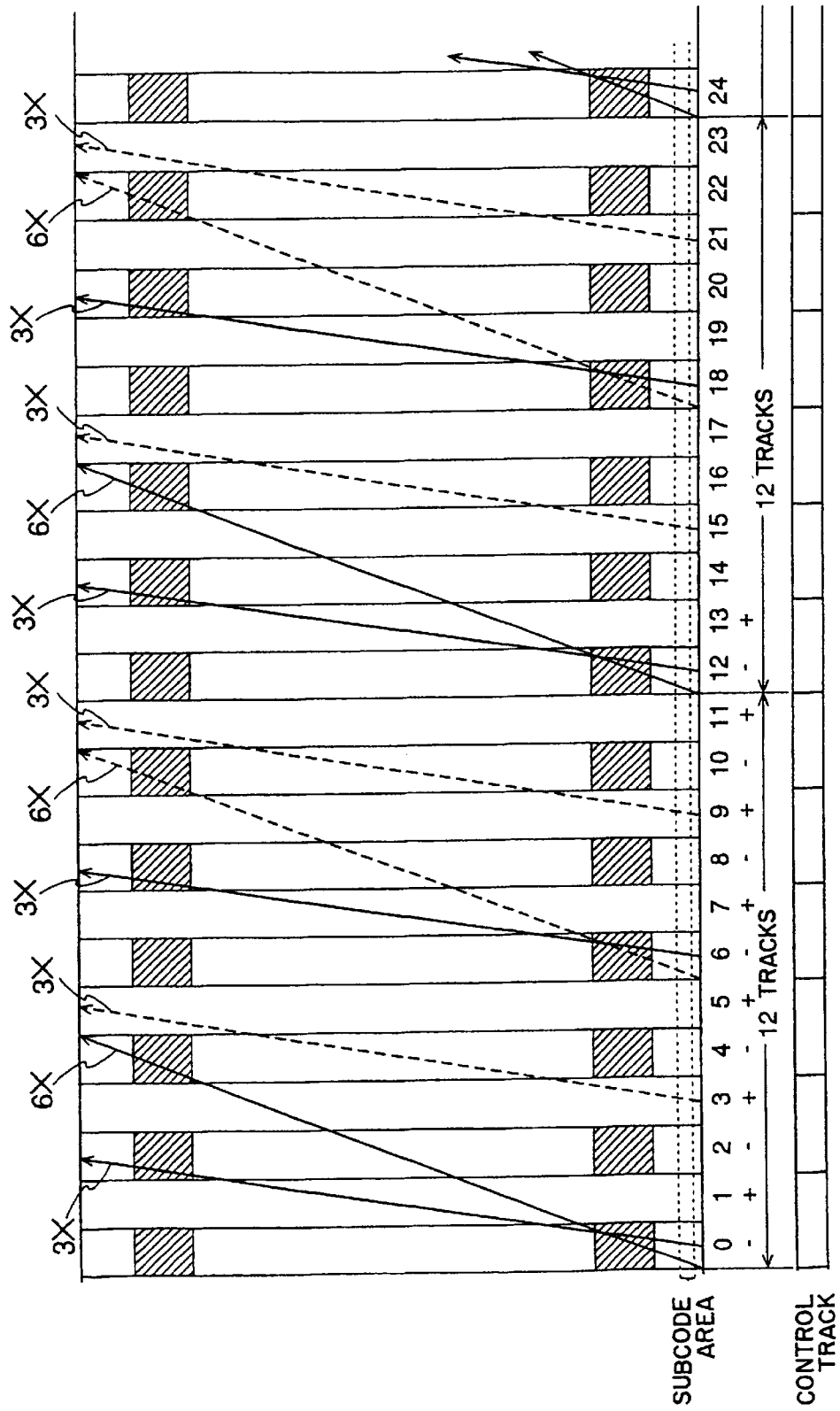
FIG. 1 is a diagram showing one example of a track pattern for fast reproduction.
Figure 2:
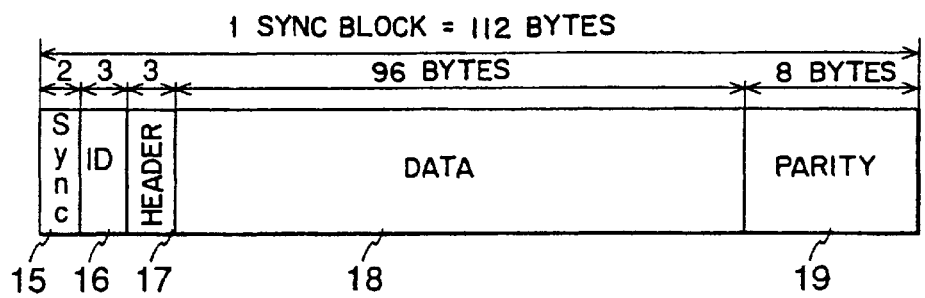
FIG. 2 is a diagram showing a format of one example of a data block recorded by the invention.

FIG. 2 shows a format of one example of this sync block. As shown in the same diagram, the sync block comprises 112 bytes wherein an area 15 of 2-byte synchronous signal (Sync) for reproducing the sync block, an area 16 of 3-byte address information (ID), a 3-byte header storage area 17 for storing various information, a 96-byte substantial data storage area 18, and a 8-byte parity area 19 for correcting an error of this sync block information, are sequentially synthesized.

The embodiment records, for example, a digital signal of 188-byte packet size in the transport packet (TP) transmission system of MPEG2 (Moving Picture Experts Group 2), on the above data storage area 18.

Figure 3:
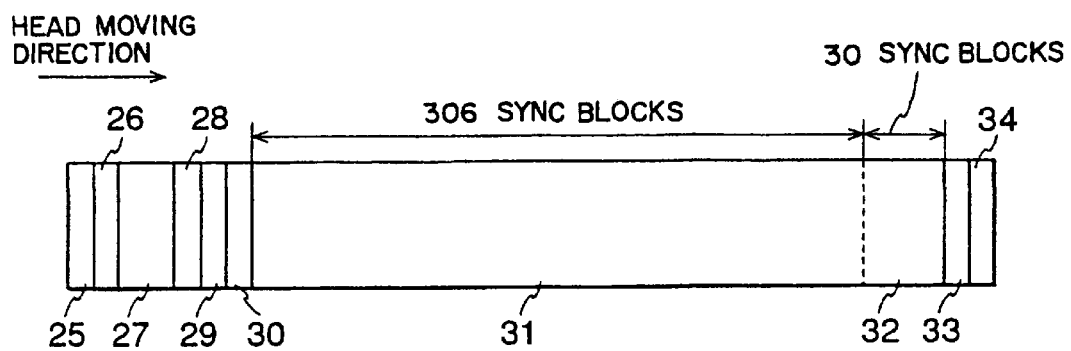
FIG. 3 is a diagram showing a format of one example of one track formed by the invention.

FIG. 3 shows a track format in the embodiment. As shown in the same diagram, one track comprises a margin area 25, a preamble area 26, a subcode area 27, a postamble area 28, an IBG (Inter Block Gap) area 29, a preamble area 30, a data area 31, an error correcting code area 32, a postamble area 33, and a margin area 34.

Of the data area 31 and the error correcting code area 32 having main data areas, the data area 31 is set to 306 sync blocks in the embodiment. Also the error correcting code area 32 is an area on which an outer code (C3 code) for error correction is recorded, comprising 30 sync blocks.

Figure 4:
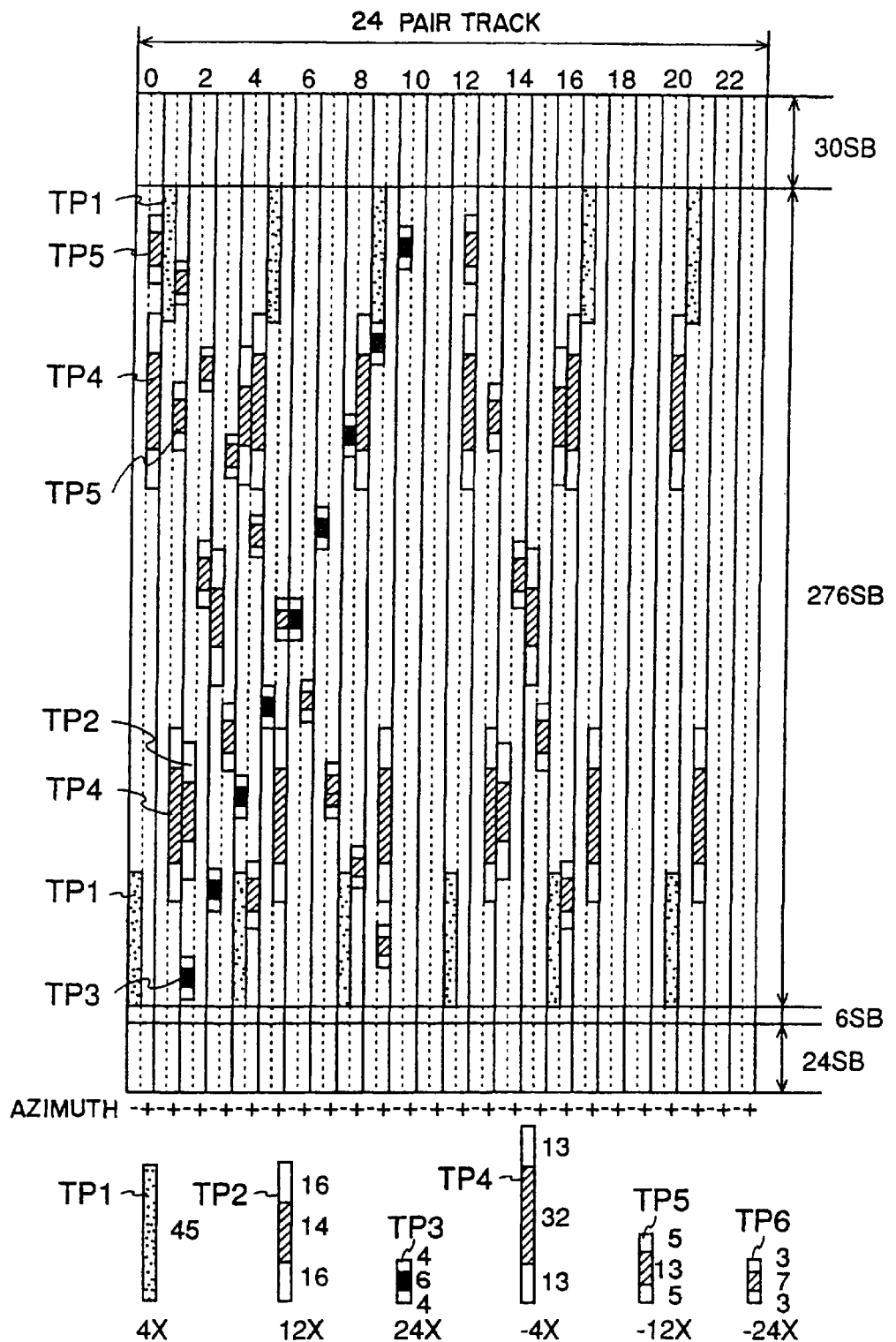
FIG. 4 is a diagram showing a track pattern recorded by one embodiment of the recording method of the invention.

FIG. 4 shows one embodiment of a track pattern on the recording medium of the invention. FIG. 4 shows 24 pair tracks (48 tracks) recorded by a first rotating head with +azimuth angle and a second rotating head with −azimuth angle. Each track shows an area of 336 sync blocks having the data area 31 and the error correcting code area 32 shown in FIG. 3. In the embodiment, recorded at the predetermined particular locations are a first special reproducing data TP1 of forward 4-fold speed (4x), a second special reproducing data TP2 of forward 12-fold speed (12x), a third special reproducing data TP3 of forward 24-fold speed (24x), a fourth special reproducing data TP4 of backward 4-fold speed (−4x), a fifth special reproducing data TP5 of backward 12-fold speed (−12x), and a sixth special reproducing data TP6 of backward 24-fold speed (−24x).

The first special reproducing data TP1 is composed of 45 sync blocks; the second special reproducing data TP2, 46 sync blocks; the third special reproducing data TP3, 14 sync blocks; the fourth special reproducing data TP4, 58 sync blocks; the fifth special reproducing data TP5, 23 sync blocks; and the sixth special reproducing data TP6, 13 sync blocks. The block length of each of these special reproducing data, is set to a length that can be reproduced, even though a rotating head scanning track at special reproduction is shifted slightly.

Also in FIG. 4, portions on which special reproducing data TP1 to TP6 are not located and recorded, show a track portion on which normal reproducing data is recorded. Further, of the special reproducing data TP1 to TP6, blank portions of TP2 to TP6 show a sync block duplicated twice and recorded.

Figure 5:
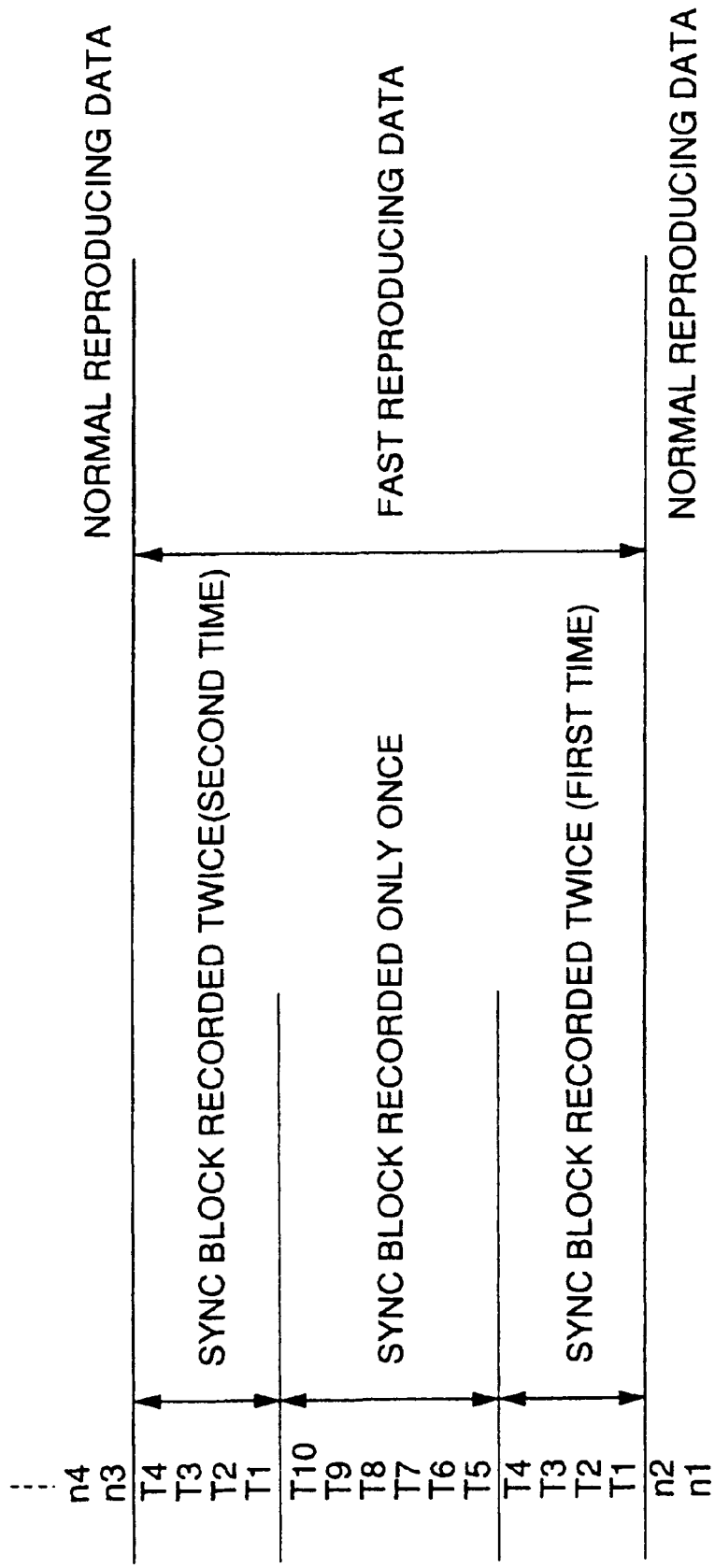
FIG. 5 is a diagram explaining duplicative recording of special reproducing data recorded according to the invention.

For example, taking the special reproducing data TP3 as an example, the first 4 sync blocks and the last 4 sync blocks show a blank, respectively. As shown in FIG. 5, this shows: the sync blocks of information of the T1 to T4 are recorded in the first 4 sync blocks; the sync blocks of information of the following T5 to T10, in the next 6 sync blocks; and the sync blocks of the T1 to T4 with the same information as the first 4 sync blocks, in the last 4 sync blocks. Also normal reproducing data n1, n2, n3, . . . are sequentially synthesized and recorded before and after this special reproducing data.

The summary of the number of sync blocks, record data rate, reproduction data rate and so on, of the above special reproducing data in the above-explained track pattern in FIG. 4, is shown in the following table. Still, in the following table, SB is an abbreviation of sync block; 1SB is calculated as an average of 94 bytes.

TABLE 1

| 2-fold rate | Burst/ Scan | SB(a)/ Scan | SB(b)/ Scan | Record SB/TPF | Reproduction SB/Scan | Record data rate (kbps) | Reproduction data rate (kbps) |
| --- | --- | --- | --- | --- | --- | --- | --- |
| +4 | 2 | 45 | 0 | 0 | 90 | 507.6 | 2.03 |
| +12 | 3 | 14 | 16 | 16 | 90 | 259.44 | 2.03 |
| +24 | 9 | 6 | 4 | 4 | 90 | 117.44 | 2.03 |
| −4 | 2 | 32 | 13 | 13 | 90 | 654.24 | 2.03 |
| −12 | 5 | 13 | 5 | 5 | 90 | 216.2 | 2.03 |
| −24 | 9 | 7 | 3 | 3 | 90 | 109.98 | 2.03 |

Still, in the above table, SB(a) means the number of sync blocks that is not duplicated and recorded in the special reproducing data block; SB(b), the number of sync blocks that is duplicated and recorded in the special reproducing data block; TPF, a trick play frame; and scan, one rotation of a rotator such as a rotating drum. As shown in FIG. 4, when six kinds of the special reproducing data TP1 to TP6 are all recorded, as shown in Table 1, all special reproducing data are recorded at 2481.25 SB per second, the percentage occupied in the amount of all recorded data (60×306 (SB/s)) is 13.5%. This recordable data rate of normal reproducing data is 11.9 Mbps.

The embodiment assumes that the data rate of normal reproducing data may change. When the data rate of the normal reproducing data is higher than 11.9 Mbps, the recorded amount of special reproducing data is reduced according to it. There is a method for reducing this, e.g. in the order of ascending priorities at reproduction, of the special reproducing data TP1 to TP6.

In this case, for example, 24-fold speed special reproducing data TP3 and TP6 have the lowest priority; and the priority is ascending in the order of special reproducing data TP4 of backward 4-fold speed, special reproducing data TP1 of forward 4-fold speed, special reproducing data TP5 of backward 12-fold speed, and special reproducing data TP2 of forward 12-fold speed. Then, as the data rate of normal reproducing data is higher than 11.9 Mbps, recording of special reproducing data is omitted in the order of (1) TP3 and TP6, (2) TP4, (3) TP1, (4) TP5, and (5) TP2. Finally all records of special reproducing data are omitted; and only normal reproducing data is recorded.

The summary of special reproducing data to be recorded, the percentage of the special reproducing data, and recordable normal reproducing data rate, in this case, is shown in the following table.

TABLE 2

| Special reproducing data to be recorded | Percentage of special reproducing data (%) | Recordable normal reproducing data rate (Mbps) |
|---|---|---|
| (1) None | 0 | 13.8 |
| (2) TP2 | 1.9 | 13.5 |
| (3) TP2, TP5 | 3.4 | 13.3 |
| (4) TP2, TP5, TP1 | 7.1 | 12.8 |
| (5) TP2, TP5, TP1, TP4 | 11.9 | 12.2 |
| (6) TP2, TP5, TP1, TP4, TP3, TP6 | 13.5 | 11.9 |

In this way, according to the normal reproducing data rate, in the embodiment use of a special reproducing data area is selected, either as a special reproducing data area, or as a normal reproducing data area; and the data area of lower-priority special reproducing data is changed into the area recording normal reproducing data, so that all data areas can efficiently be split into normal reproducing data and special reproducing data while reserving the amount of normal reproducing data.

Also map information showing the data area on which special reproducing data is recorded is at the predetermined FIG. 4 location, is included in the header storage area 17 in FIG. 2. Since special reproducing data is recorded by this map information, the recorded location is fixed and not changed. A circuit (such as addressing) for recording the special reproducing data at another location according to its data amount, is not needed to be switched and can be simplified substantially.

Still, reducing the recorded amount of special reproducing data according to the increased normal reproducing data rate, is not limited to the above method. There may be, for example, a method for reducing backward special reproducing data in the order of ascending priorities to eliminate all backward special reproducing data, and then reducing forward special reproducing data in the order of ascending priorities; and a method for decreasing special reproducing data in the order of ascending priorities every 2-fold speed.

Further, of two front-to-back record areas comprising a plurality of duplicated and recorded sync blocks, shown with a blank in the special reproducing data TP2 to TP6 in FIG. 4, only one (or both) may be changed into a normal reproducing data record area, as the normal reproducing data rate increases. In this case, because the reduced, recorded amount of the special reproducing data is small, the percentage of the normal reproducing data and special reproducing data can be adjusted more finely and flexibly.

Furthermore, in FIG. 5, there may be a method for recording the normal reproducing data by stopping duplicative recording by one sync block from both of two front-to-back record areas on which the above special reproducing data record area is duplicated and recorded, in a such way that, of the sync blocks T1 to T4 duplicated and recorded twice, the first information T1 sync block and the second information T4 sync block are switched into normal reproducing data for recording.

Figure 6:
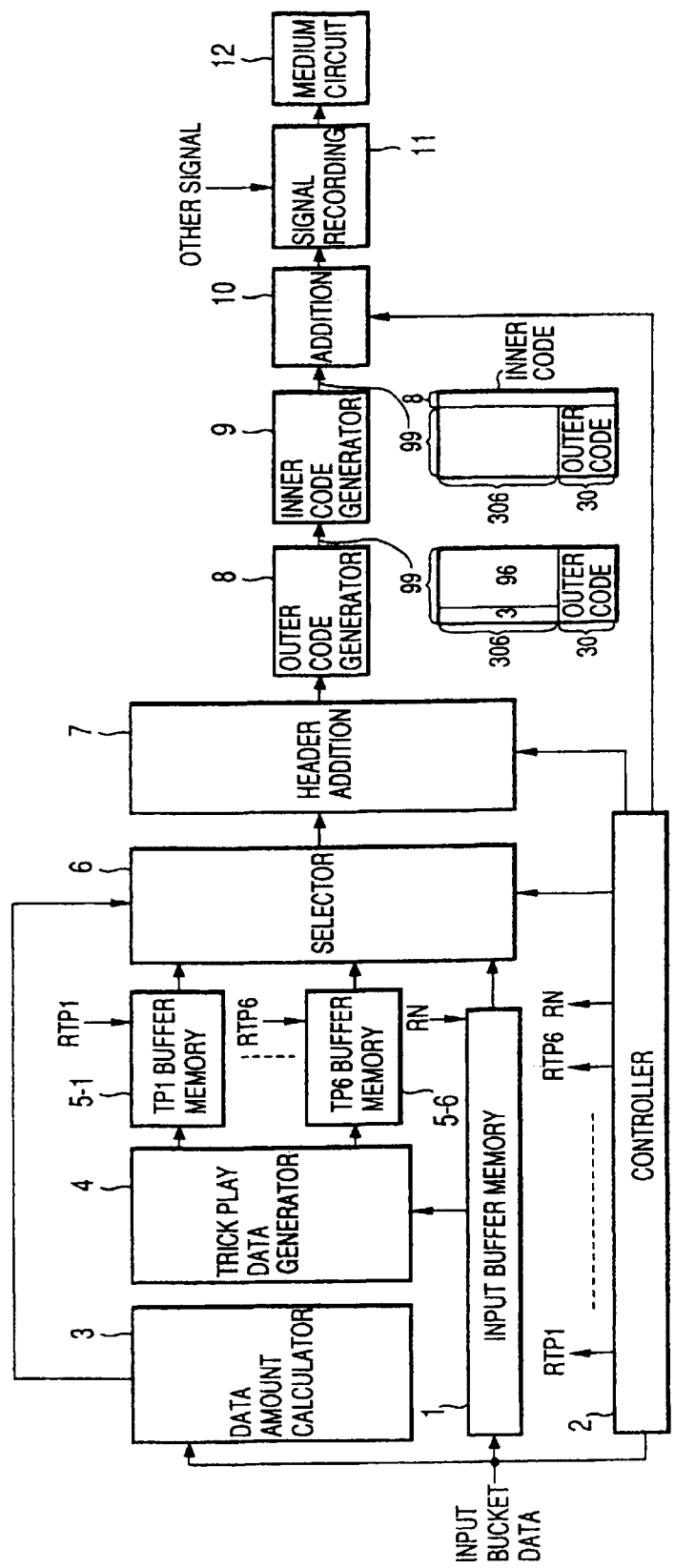
FIG. 6 is a block diagram of one embodiment of the digital signal recording apparatus of the invention.

Then, one embodiment of the recording apparatus of the invention is explained with FIG. 6 block diagram. In the same diagram, input data is normal reproducing packet data, is written into an input buffer memory 1, and is input into a control circuit 2 and a data amount calculating circuit 3, respectively. The control circuit 2 produces various control signals, such as read signals RTP1 to RTP6, RN, and a switching signal.

Also the data amount calculating circuit 3 calculates the data rate of input normal reproducing data based on the data broadcasting system and other information, detects where the data amount (data rate) falls within a data rate range to be set as compared with some predetermined references, and produces a selecting signal according to the detected data rate to output to a selecting circuit 6 described below.

The normal reproducing packet data is stored in the input buffer memory 1, and then is read by read signal RN from the control circuit 2 to be inputted to trick play data generating circuit 4 and the selecting circuit 6, respectively. The trick play data generating circuit 4 generates each of said six kinds of special reproducing data TP1 to TP6 wherein each packet, e.g. 4-byte additional information (e.g. packet arrival time and other information) is multiplexed as an additional header, and outputs these in parallel to write into each of dedicated buffer memories 5-1 to 5-6.

Each stored data of the above six buffer memories 5-1 to 5-6 is read by read signals RTP1 to RTP6 from the control circuit 2 to be inputted to the selecting circuit 6. The selecting circuit 6 selects, by packet, either one data of the above normal reproducing data and six kinds of special reproducing data TP1 to TP6, based on both of an output switching signal of the control circuit 2 and a selecting signal from the data amount calculating circuit 3, and inputs this into a header additional circuit 7.

In other words, the selecting circuit 6 selects one data of the normal reproducing data and six kinds of special reproducing data TP1 to TP6 in the predetermined particular order to output it sequentially; and at outputting either one of the six kinds of special reproducing digital signals, selects and outputs either one of the special reproducing data or normal reproducing data according to the data rate of the normal reproducing data detected by the data amount calculating circuit 3. At this time, as the data rate of the normal reproducing data increases, for example, the circuit selects the normal reproducing data instead of the lowest-priority special reproducing data of TP1 to TP6.

Also the selecting circuit 6, at selecting and outputting special reproducing data TP2 to TP6, as explained with FIG. 5, selects one portion duplicated, such that a plurality of data blocks of the special reproducing data to be duplicated and recorded, are arranged before and behind the plurality of data blocks of the special reproducing data recorded only once, without being duplicated.

Sequentially synthesized data composed of the normal reproducing data and special reproducing data TP1 to TP6 outputted from the selecting circuit 6, or one portion of these, is supplied to the header additional circuit 7; and 3-byte header information from the control circuit 2 is added to the first of the data. This header information is shown with 17 in FIG. 2. The embodiment includes, at least map information showing the six kinds of special reproducing data TP1 to TP6 are arranged and recorded on the predetermined particular area of a tape-like recording medium 12, e.g. is a track pattern as shown in FIG. 4, and information for identifying which of the special reproducing data TP1 to TP6 or normal reproducing data is selected and recorded on the six kinds of special reproducing data TP1 to TP6 record areas.

A 99-byte digital signal composed of the header and data taken from this header additional circuit 7, is inputted to an outer code generating circuit 8. The outer code generating circuit 8 generates 30 sync blocks outer code as an error correcting code when 306 sync blocks for one track is inputted to the data and header inputted by 99 (=96+3) byte.

An inner code generating circuit 9, to which the data, header, and outer code from the outer code generating circuit 8 are inputted, generates an 8-byte parity as inner code based on these. The output digital signal (data, header, outer code, and inner code) of this inner code generating circuit 9, supplied to a additional circuit 10, accepts a 2-byte synchronous signal shown with Sync in FIG. 2 and 3-byte address information shown with ID.

The output signal of the additional circuit 10 is multiplexed with a preamble, subcode, postamble, and so on recorded on areas 26, 27, 28, 30, and 33 shown in FIG. 3 by a signal recording circuit 11, is further modulated and amplified, and then is recorded on the recording medium (here magnetic tape) 12 by a recording mechanism with an unillustrated known rotating head. This forms a track pattern as shown in FIG. 4, based on the map information included in the header, and records normal reproducing data and special reproducing data TP1 to TP6. Also according to the data rate of the normal reproducing data, the normal reproducing data, into which a portion or all of the special reproducing data TP1 to TP6 are converted, are recorded.

In the embodiment, map information is used for recording normal reproducing data into which a portion or all of special reproducing data TP1 to TP6 are converted, according to the data rate of the normal reproducing data; because the special reproducing data record area is not changed, the circuit (such as addressing) for locating special reproducing data is not needed to be switched.

Figure 7:
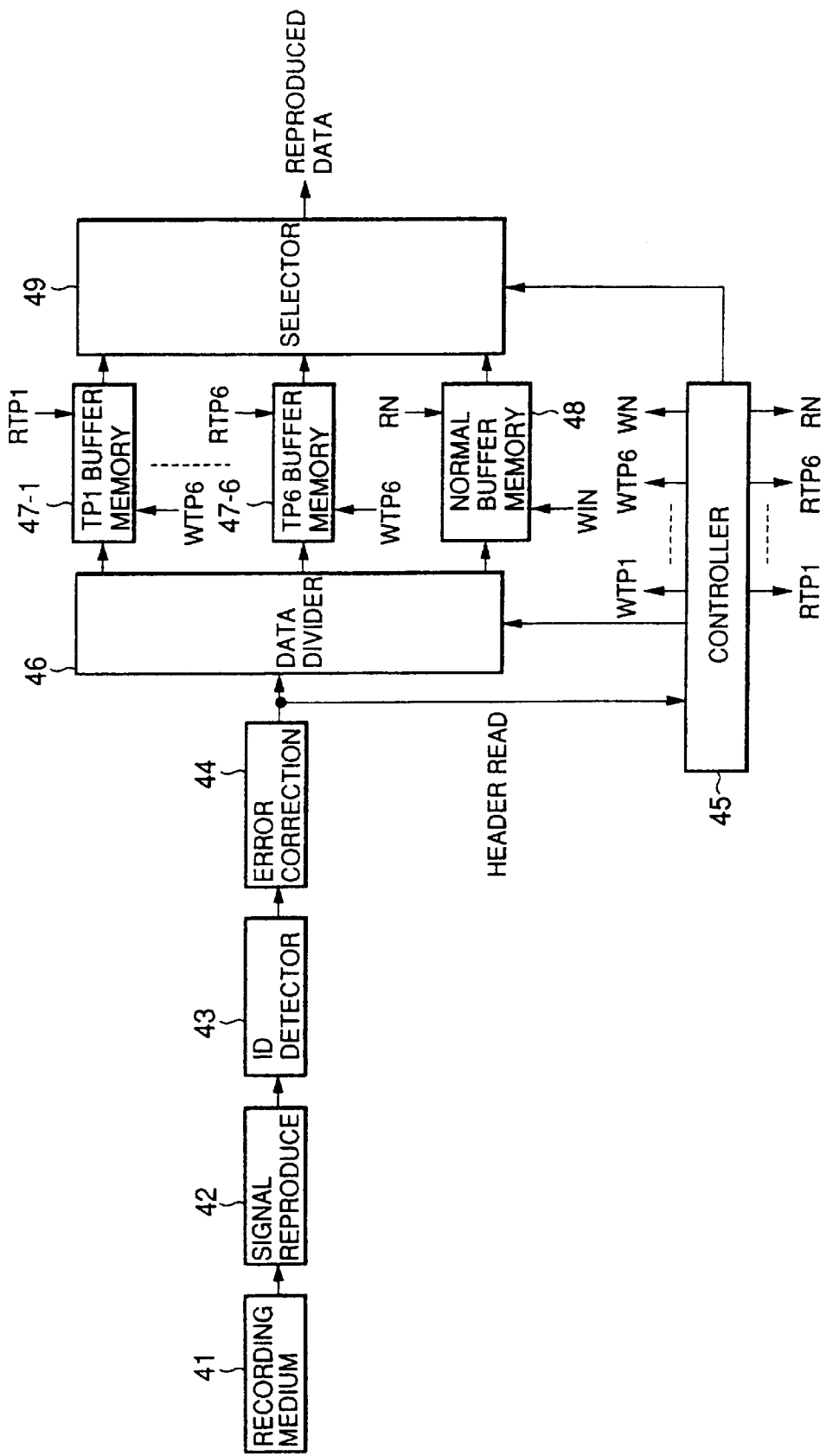
FIG. 7 is a block diagram of one example of a digital signal reproducing apparatus.

Then, the structure and operation of the digital signal reproducing apparatus reproducing a recording medium of the invention, are explained with FIG. 7 block diagram. In the same diagram, a recording medium 41 is the same recording medium as the above recording medium 12. The recording digital signal is reproduced by a known reproducing mechanism (here mechanism including a rotating head), and then is supplied to a control circuit 45 and a data dividing circuit 46 through a signal reproducing circuit 42, an ID detecting circuit 43, and an error correcting circuit 44, respectively.

The control circuit 45 analyzes a reproducing digital signal header to produce a control signal of the data dividing circuit 46, produces write control signals WTP1 to WTP6 and WN of buffer memories 47-1 to 47-6 and 48, analyzes 4-byte additional information (additional header) in the reproducing digital signal, refers to packet arrival time, and produces read control signals RTP1 to RTP6 and RN so as to read a packet with the same timing.

The data dividing circuit 46 divides the input reproducing digital signal in special reproducing data TP1 to TP6, based on the above control signals, into the buffer memories 47-1 to 47-6 for input; and inputs the signal in normal reproducing data, to the buffer memory 48. Also in the special reproducing data TP2 to TP6, the circuit selects and outputs only either one of a plurality of data blocks of two special reproducing data duplicated and recorded. Therefore, even a slightly shifted head scanning track can reproduce the special reproducing data favorably.

The stored special reproducing data of the buffer memories 47-1 to 47-6 provided dedicatedly for each of the special reproducing data TP1 to TP6, and the stored normal reproducing data of the buffer memory 48 only for the normal reproducing data, are read based on the read control signals RTP1 to RTP6, and RN from the control circuit 45; and one kind of data specified by a selecting circuit 49 is selected to be outputted as reproducing data.

Still the invention is not limited to the above embodiment. The kinds of special reproducing data may naturally be one with a 2-fold speed rate other than the above; and the number of the kinds is not restrictive to six.

Also the above embodiment is explained such that map information showing special reproducing data is a track pattern located and recorded on the predetermined particular-area of a tape-like recording medium, is included in a header; however the invention is not limited to this, for example, may be recorded at a particular location on the predetermined track of the subcode area (27 in FIG. 3) and others.

Further, it is explained such that the special reproducing data is generated from normal reproducing data inputted, but may be generated separately to be inputted to a recording apparatus with the normal reproducing data.

Further embodiments of the invention are explained with reference to the drawings.

In the embodiments, a track format of one track formed on a magnetic tape is the same as FIG. 3.

Figure 8:
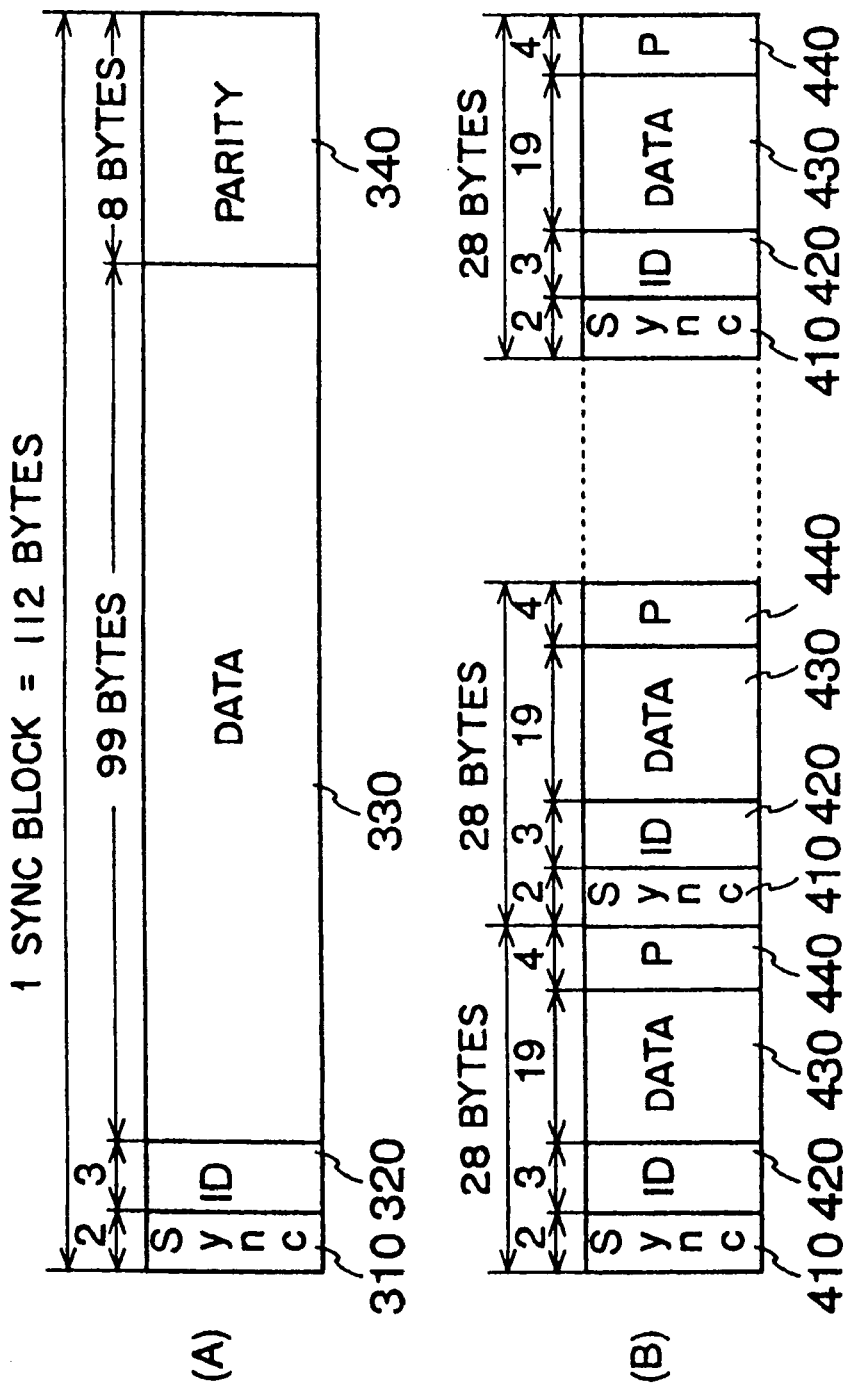
FIG. 8 is a diagram showing one example of a format of the data area and subcode area of a track recorded according to the invention.

FIG. 8 shows one example of a format of the data area and subcode area of a track. FIG. 8 (A) shows one example of a format of the sync block of the main data area 31 on which FIG. 3 main data is stored; and FIG. 8 (B) shows one example of a format of the subcode area 27.

As shown in FIG. 8 (A), a sync block that is a data block within the main data area 31 in FIG. 3, is composed of 112 bytes wherein a 2-byte synchronous signal (Sync) area 310 for reproducing the sync block, a 3-byte address information (ID) area 320, a 99-byte data storage area 330 including a 3-byte header for storing various information, and a 8-byte parity area 340 for correcting an error of information of this sync block, are sequentially synthesized. In the embodiment, for example, a digital signal in the transport packet (TP) transmission system of MPEG2 (Moving Picture Experts Group 2), is recorded on the above data storage area 330 as normal reproducing data or special reproducing data.

Also as shown in FIG. 8 (B), the format in the subcode area 27 in FIG. 3 is composed of 448 bytes wherein, for example, 16 28-byte blocks comprising a 2-byte synchronous signal (Sync) area 410, a 3-byte address information (ID) area 420, a 19-byte data area 430, and a 4-byte parity area 440, are sequentially synthesized. These 16 blocks are independent of one another.

Figure 9:
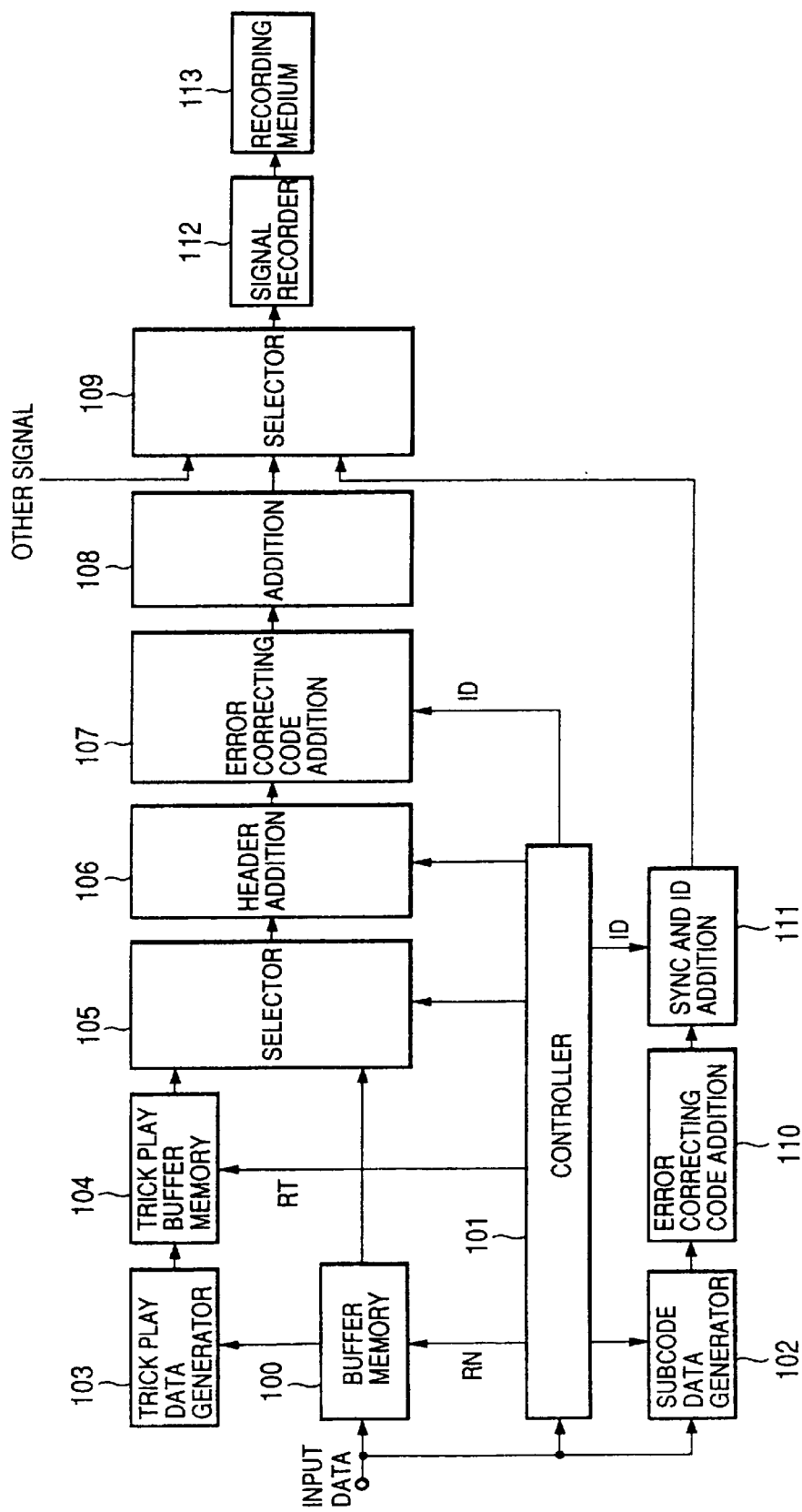
FIG. 9 is a block diagram of one embodiment of recording system of the digital signal recording and reproducing method and the recording and reproducing apparatus of the invention.

FIG. 9 is one embodiment of a recording apparatus recording a format signal shown in FIGS. 8 (A) and (B). Input normal reproducing data, stored in a buffer memory 100, is read by the read control signal RN from a control circuit 101 to be supplied to a trick play data generating circuit 103, and to a selecting circuit 105.

Also the control circuit 101 calculates the data rate of the normal reproducing data inputted, and produces a selecting signal according to some data rate sizes wherein the data amount (data rate) is set in comparison with the predetermined reference, to output to the selecting circuit 105.

The trick play data generating circuit 103 generates a multiple kind trick play (special reproducing) data, based on input normal reproducing data, further multiplexes these, e.g. 4-byte additional information (e.g. packet arrival time and other information) as an additional header, outputs these multiple kind data in parallel, and writes the data in each dedicated memory portion within a trick play buffer memory 104.

Each stored data in this buffer memory 104 is read based on read control signal RT from the control circuit 101, to be outputted to the selecting circuit 105. The selecting circuit 105 selects one data of the above normal reproducing data or special reproducing data based on a switching signal from the control circuit 101, to supply to a header additional circuit 106.

In other words, according to the selecting signal from the control circuit 101, the selecting circuit 105 generally selects one data of normal reproducing data and special reproducing data in the predetermined particular order, to output sequentially; and increases the percentage for selecting normal reproducing data into which special reproducing data is converted, as the data rate of normal reproducing data detected by the control circuit 101 is elevated (as the amount of normal reproducing data to be recorded increases). Also at this time, the control circuit 101 outputs a trace start flag (marker information) for said track select, to a subcode data generating circuit 102.

From this, the control circuit 10 controls switching of said read control signals RN and RT and a switching signal to the selecting circuit 105. When the data rate of normal reproducing data is low, the circuit allows special reproduction of phase lock (which reproduces all necessary data even if head scanning is started from any track on a magnetic tape) by repeating the same special reproducing data multiple times to be selected from the selecting circuit 105 at the desired intervals, in such a way that the selected percentage of special reproducing data is maximized in comparison with normal reproducing data to be located at the predetermined particular medium location. As the data rate of normal reproducing data is elevated, the circuit permits special reproduction of said track (which starts head scanning from the desired track to reproduce the desired speed fast-reproducing data) by selecting much normal reproducing data into which special reproducing data is converted.

A sequentially synthesized signal of normal reproducing data and special reproducing data selected and outputted from the selecting circuit 105 like the above, is supplied to the header additional circuit 106; and the header information from the control circuit 101 is added to the beginning of it. This header information includes at least information for identifying which of special reproducing data or normal reproducing data is selected and recorded on a special reproducing data record area, and includes map information showing, e.g. special reproducing data is a track pattern located and recorded on the predetermined particular area of a tape-like recording medium 113.

A 99-byte digital signal composed of the header and normal reproducing data or special reproducing data taken from this header additional circuit 106, is supplied to a error correcting code additional circuit 107, wherein a 30 sync blocks outer code as an error correcting code generated every time sync blocks recorded on one track data area (306 sync blocks of the data area 31 in FIG. 3) and an 8-byte parity generated by 99 bytes, are added and is supplied to an additional circuit 108. In FIG. 8, a 2-byte synchronous signal shown with Sync and 3-byte address information shown with ID and so on, are added by the control circuit 101 to be generated in a sync block.

On the other hand, the subcode data generated by the subcode data generating circuit 102 is supplied to an error correcting code additional circuit 110, wherein a 4-byte parity generated by 19 bytes are added as an error correcting code, and then is supplied to a Sync and ID additional circuit 111. A 2-byte synchronous signal (Sync) shown and 3-byte address information (ID), as shown in FIG. 8 (B), which are inputted by the control circuit 101, are added.

A digital signal outputted from the additional circuits 108 and 111, respectively, is supplied to a selecting circuit 109 with other separately generated signals (preamble signal, postamble signal, and so on), and is made to be a sequential signal of the track format shown in FIG. 3 by selecting either one signal, to be inputted to a signal recording circuit 112.

The signal recording circuit 112 modulates and amplifies an input digital signal with the desired modulating system, and then forms sequentially a track whose longitudinal direction is tilted against the longitudinal direction of the tape on a recording medium (here magnetic tape) 113 by a recording mechanism with an unillustrated known rotating head, for magnetic recording.

Figure 10:
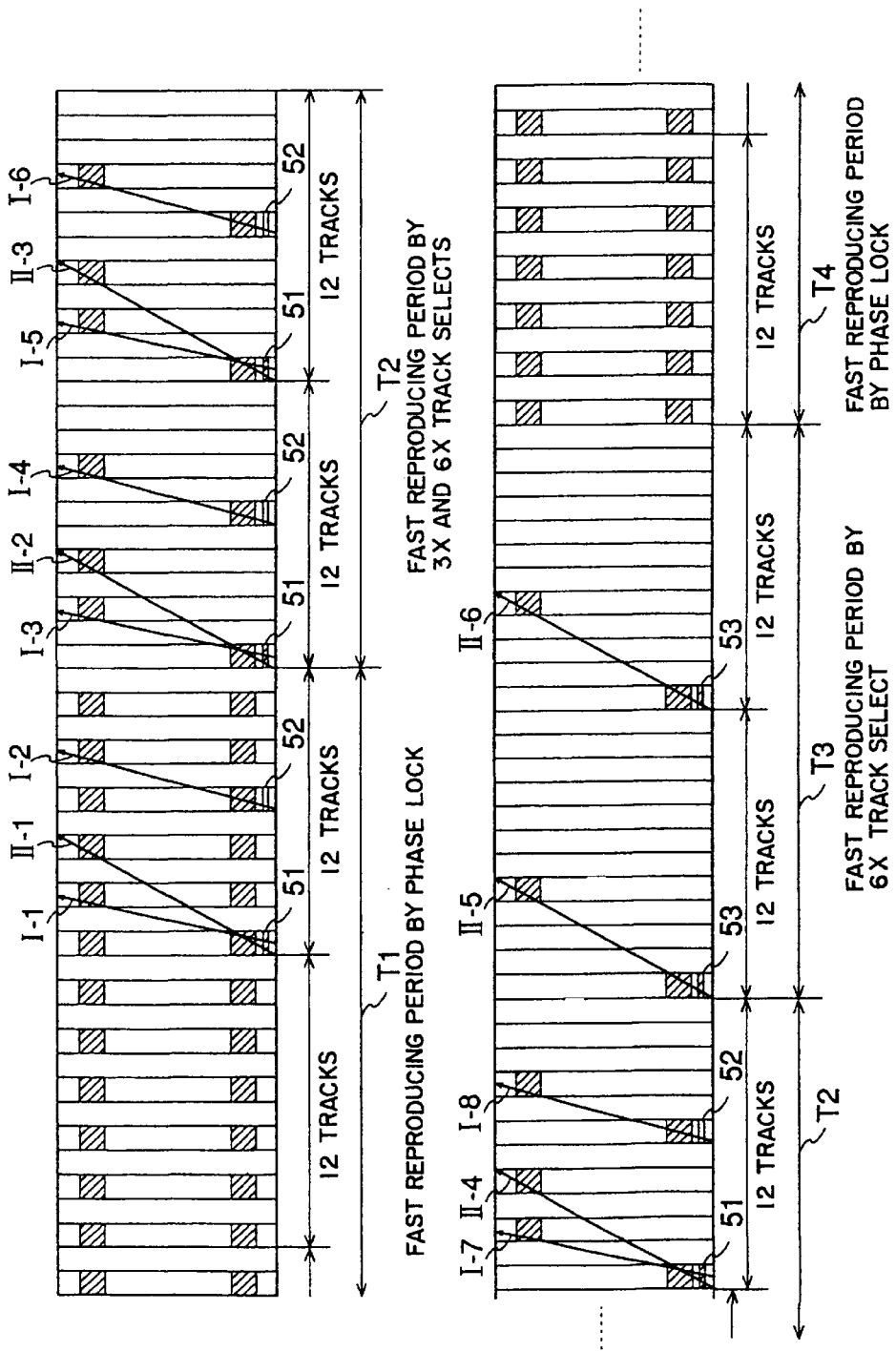
FIG. 10 is a diagram showing one example of a track pattern recorded and reproduced according to the invention.

This forms a track pattern e.g. as shown in FIG. 10 on the recording medium 113, and records sequentially synthesized data of normal reproducing data and special reproducing data. Also the special reproducing data is located on the predetermined particular area of each track, but the normal reproducing data into which a portion or all of the special reproducing data is converted, according to the data rate of the normal reproducing data (i.e. the record area of the normal reproducing data) is recorded.

In FIG. 10, the diagonally shaded rectangular portion shows a record location of 6-fold speed fast-reproducing data as one example of special reproducing data; and the track portion other than that records normal reproducing data. In section T1, this fast-reproducing data is recorded at two locations of each track by two tracks recorded with a rotating head with the same azimuth angle, and at a period of 12 tracks in which the same data is horizontally multiplexed and recorded six times. This is the case where the fast-reproducing data is recorded at all the predetermined particular locations, and the amount of normal reproducing data is at the minimum.

Also in section T2, the fast-reproducing data is recorded at one location immediately after the first on the first and seventh tracks; and the data is recorded at a period of 12 tracks recorded at one location immediately before the end on the third, fifth, and ninth tracks. At this time, at 7 of 12 particular locations for the predetermined fast-reproducing data within the 12 tracks, normal reproducing data into which the fast-reproducing data is converted, is switched and recorded. This section T2 is a section wherein the amount of normal reproducing data is relatively large.

Further, in section T3, fast-reproducing data is recorded at one location immediately after the first of the first track, and is recorded at a period of 12 tracks recorded at one location immediately before the end of fifth track. At this time, at 10 of 12 particular locations for the predetermined fast-reproducing data within the 12 tracks, normal reproducing data into which fast-reproducing data is converted, is switched and recorded. This section T3 is a section wherein the amount of normal reproducing data is relatively large. Also section T4 is a section recording like the section T1. Still, 3- and 6-fold speeds trace start marker 51, 3-fold speed trace start marker 52, or 6-fold speed trace start marker 53 are recorded at a fast-reproducing head scanning (trace) start location on a subcode area.

This track pattern permits 3-fold speed fast reproduction by creating head scanning tracks I-1, I-2, I-3, . . . , and I-8, and permits 6-fold speed fast reproduction by creating head scanning tracks II-1, II-2, . . . , and II-6. Also sections T1 and T4 permits fast reproduction by phase lock; section T2, 3- and 6-fold speed fast reproductions by track select; and section T3, 6-fold speed fast reproduction by track select.

In this way, according to the embodiment, when the amount of normal reproducing data is small, 3- and 6-fold speed fast reproductions by phase lock can be made, being rapidly performed by starting head scanning with any track. When the amount of normal reproducing data is relatively large, both of 3- and 6-fold speed fast reproductions by track select can be made, and further, when the amount of normal reproducing data is large, 6-fold speed fast reproduction by a track select can be performed. The above is explained such that fast-reproducing data recorded within one program at all time is switched, but when a plurality of programs are recorded on a tape, such control may naturally be made by program.

Then, a method for specifying a scanning start track (marker information recording and reproducing method), which is needed for fast reproduction by track select that permits fast reproduction only for the head scanning track of a certain head scanning start phase, at the above particular speed.

To specify this scanning start track, there are: (1) using control track, (2) recording flag on subcode area, (3) writing start track information (such as flag) with information that can discriminate data line, on subcode area, when a plurality of start phases are needed for each fast-reproducing data line, (4) writing track information up to scanning start track on main data area of each track, (5) writing track information up to scanning start track on subcode area of each track, and (6) recording at the same time information that can discriminate data line, when a plurality of start phases are needed for each fast reproducing data line, in the above 4 or 5 method.

(1) Using control track

Figure 11:
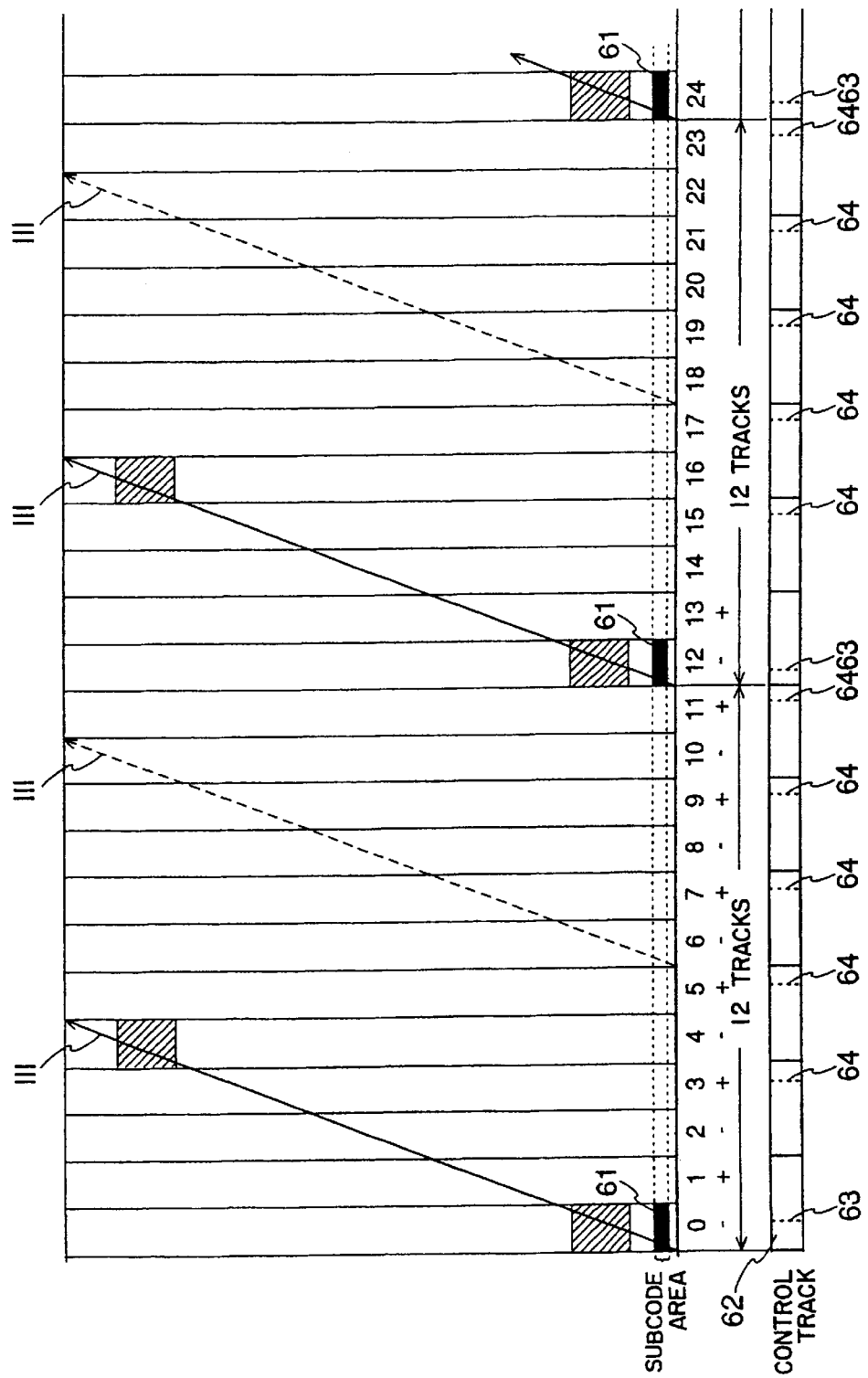
FIG. 11 is a diagram showing one example of a 6-fold speed reproducing track pattern recorded and reproduced according to the invention.

This method differentiates the duty rate of a control signal from the duty rate of other than that, at the location of a control track 62 for fast-reproducing scanning start track for each 12 tracks with track numbers 0, 12, 24, . . . , at recording a track pattern in FIG. 11 showing the record location of fast-reproducing data in the diagonally shaded rectangular portion. In the control track 62 in FIG. 11, when a solid line is the start-up record location of a control signal; and a broken line is the start-down record location of the control signal. In general, this start-down record location of the control signal is shown with 64. The location for the control track 62 corresponding to the above tracks with track numbers 0, 12, 24, . . . is differentiated from the location shown with 63.

As described below, at reproduction, the duty rate of a reproducing control signal is checked to detect timing of portions with different duty rate for each 12 tracks. In comparison with a rotating phase of a rotator on which a rotating head is mounted, error voltage for controlling the horizontal phase of a magnetic tape is produced to control capstan motor rotation. Still, FIG. 11 shows such that there is a corresponding control signal directly below a track. This is a conceptual diagram showing a one-to-one correspondence between each track and control signal. An actual control signal is a constant amount away from the track on the tape.

(2) Recording flag on subcode area

Figure 12:
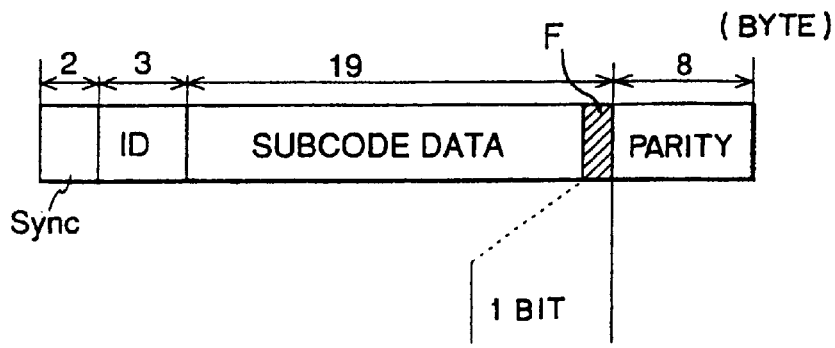
FIG. 12 is a diagram explaining one example wherein head scanning start track information is recorded on the subcode area.

This method provides a fast-reproducing start track discriminating flag within the 448-byte subcode area 27 of 16 data blocks shown in FIG. 3. and FIG. 8 (B). For example, in the first 28-byte block of a subcode area, the last one of 19 bits of the subcode data area is provided as a fast-reproducing start track detecting flag, as shown with F in FIG. 12, so that, when this flag F value is "1," the track is a fast-reproducing scanning start track.

In other words, the above flag F is "1," on a track subcode area 61 for each 12 tracks with track numbers 0, 12, 24, . . . in FIG. 11 at recording; and it is "0" on a track subcode area other than that. At fast reproduction, when the above flag detected for reproducing a subcode area is "0," a capstan motor rotating phase is controlled so that a tape phase is shifted for two tracks. The phase control within the two tracks compares the phase of a control signal with that of a rotating drum like a conventional servo, controlling them in relation to the predetermined phase. This obtains a fast-reproducing head scanning track shown with III in FIG. 11.

Still, here the above fast-reproducing start track detecting flag is provided only on one subcode block, but to increase the detecting ability, the same information may repeatedly be located on a plurality of (e.g. all) subcode blocks within the same subcode area.

(3) Writing start track information (such as flag) with information that can discriminate data line, on subcode area, when a plurality of start phases are needed for each fast-reproducing data line.

This method assigns a particular bit within a subcode block of the subcode area shown in FIG. 3 and FIG. 8 (B) of each track, and sets the particular bit value to a different value on a fast-reproducing start track and a track other than that. For example, when recording two kinds of fast-reproducing data, e.g. in the first 28-byte block of a subcode area, the last two of 19 bits of the subcode data area are provided as a fast-reproducing start track detecting flag so that this flag value allows a reproducing apparatus to detect what kind of 2-fold speed the track as a fast-reproducing scanning start track is.

Figure 13:
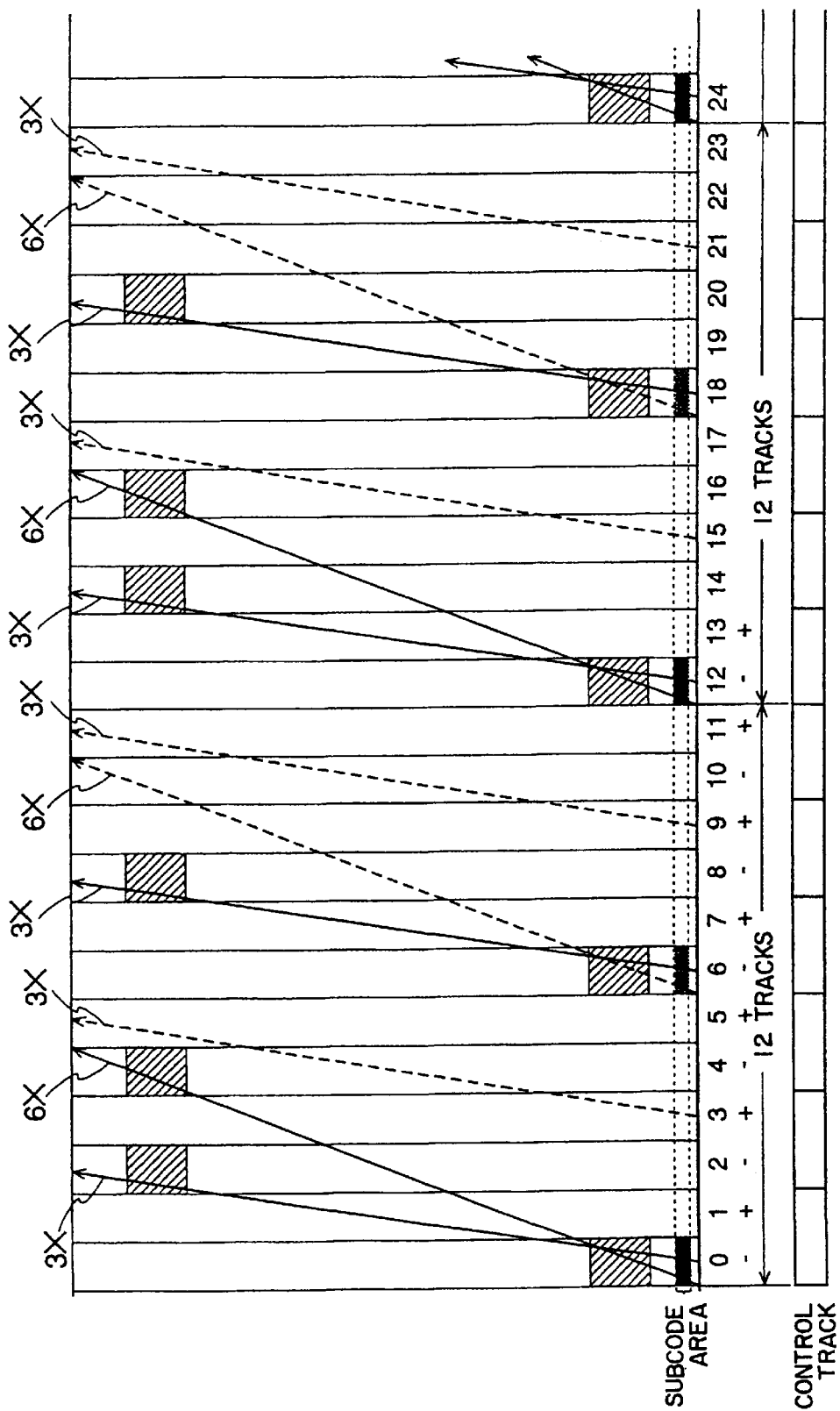
FIG. 13 is a diagram showing one example of two kinds of fast-reproducing track patterns recorded and reproduced according to the invention.

For this method, the summary of each track number and contents for the above 2-bit flag value (bit pattern) in the diagonally shaded rectangular portion, e.g. at recording the subcode area of the track pattern in FIG. 13 showing the record locations of 3- and 6-fold speed fast-reproducing data, is shown in the following table.

TABLE 3

| Track number | Bit pattern | Contents |
| --- | --- | --- |
| 0, 12, 24, . . . | 11 | 3- and 6-fold speed scanning start tracks |
| 6, 18, 30, . . . | 01 | 3-fold speed scanning start track, not 6-fold speed |
| Other even number track | 00 | Not scanning start track |

Further, at 6-fold speed fast reproduction in the above track pattern in FIG. 13, a subcode area of a track with an azimuth angle on which fast-reproducing data is not recorded at servo lock, cannot be reproduced; however, at 3-fold speed, a subcode area of a track with a reverse-azimuth angle, can be reproduced, using information of a track with a reverse-azimuth angle for servo lock. In other words, the following information is written on the subcode area of the track with the reverse-azimuth angle. Bit pattern "01" is written in for each 6 tracks with track numbers 3, 7, 15, . . . This contents shows a 3-fold speed fast-reproducing start track, as shown in Table 3, and not 6-fold speed fast-reproducing start track. This can make the servo lock retracting time shorter.

Head scanning start phase within the 2 tracks is controlled with the predetermined optimum offset value, based on a control signal, like the method (2) Recording flag or subcode area. Still, here the above flag is provided only on one subcode block, but to increase the detecting ability, the same 2-bit information (bit pattern) may repeatedly be located on a plurality of (e.g. all) subcode blocks within the same subcode area.

(4) Writing track distance information from each track to scanning start track on each track main data area This method records the number of fast-reproducing head scanning start tracks (also hereinafter called distance information) on the main data area 31 shown in FIG. 3 of each track, and then reproduces this number of head scanning start tracks at reproduction for making servo lock in a short time. A sync block storing the above distance information is, e.g. the first sync block of the main data area 31 of a track with the same azimuth angle as a track on which fast-reproducing data is stored.

Figure 14:
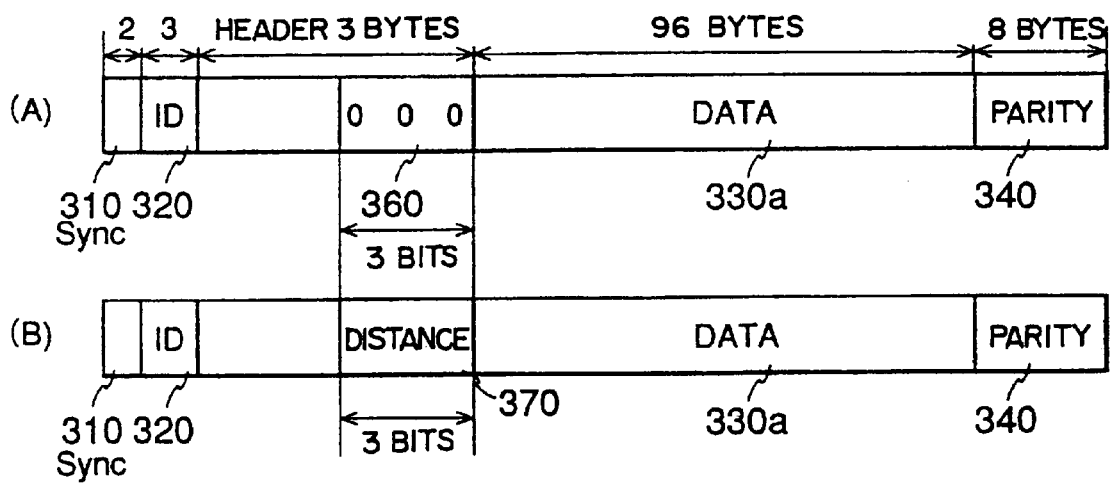
FIG. 14 is a diagram explaining one example wherein the head scanning start track information is recorded on the main data area.

In other words, a normal sync block in said main data area 31 is formed as shown in FIG. 8 (A). A header 360 is located on the first 3 bytes of the 99-byte data area 330, as shown in FIG. 14 (A). The above distance information is recorded and reproduced, e.g. with low order 3 bits 370 of this header 360, as shown in FIG. 14 (B). Naturally, to increase the detecting ability, the distance information may be recorded on a plurality of sync blocks in the main data area 31 (FIG. 3) with a track with the same azimuth angle as a track on which fast-reproducing data is stored. However, it should be noted that, in this method, depending on the sync block location within the track, even the same track changes the distance to a scanning start track.

The summary of the track numbers, distance values, distance data, 3-bit distance information in this method is shown in the following table. The distance data is a value for converting the distance value to 3 bits. Also, in the following table, a positive value shows that a fast-reproducing scanning start track is located in tape running direction (forward) against the scanning location of a rotating head; a negative value shows that the track is located backward.

TABLE 4

| Track number | Distance | Distance data | 3-bit value |
|---|---|---|---|
| 0 | 0 | 0 | 000 |
| 2 | −2 | −1 | 111 |
| 4 | −4 | −2 | 110 |
| 6 | −6 | −3 | 101 |
| 8 | 4 | 2 | 010 |
| 10 | 2 | 1 | 001 |
| 12 | 0 | 0 | 000 |
| 14 | −2 | −1 | 111 |
| 16 | −4 | −2 | 110 |

Also fast-reproducing lockin time can further be shorter by recording the same distance information on a track recorded by way of a rotating head with a reverse equivalent of the azimuth angle of a rotating head recording a fast-reproducing track, and then by reproducing the distance information by way of a rotating head with a reverse-azimuth angle to check a phase. The distance information to be recorded on this track with the reverse azimuth angle, is shown in the following table with track numbers and so on.

TABLE 5

| Track number | Distance | Distance data | 3-bit value |
|---|---|---|---|
| 1 | 5 | 3 | 011 |
| 3 | 3 | 2 | 110 |
| 5 | 1 | 1 | 001 |
| 7 | −1 | −1 | 111 |
| 9 | −3 | −2 | 110 |
| 11 | −5 | −3 | 101 |
| 13 | 5 | 3 | 011 |
| 15 | 3 | 2 | 010 |
| 17 | 1 | 1 | 001 |
| 19 | −1 | −1 | 111 |

Head scanning start phase within the 2 tracks is controlled with the predetermined optimum offset value, based on a control signal, like the method (2) Recording flag on subcode area.

(5) Writing track distance information from each track to scanning start track in each track subcode area This method records the same distance information as 4 in the subcode area 27 shown in FIG. 3. This method uses, e.g. particular 3 bits of a header located on the first of the 19-byte data area 430 in the 28-byte data block shown in FIG. 8 (B), to record and reproduce the above distance information. The data area 430 storing this distance information is e.g. one or more data areas of a track with the same azimuth angle as a track on which fast-reproducing data is stored.

(6) Recording at the same time information that can detect data line, when a plurality of start phases are needed for each fast-reproducing data line This method provides a dedicated area within a main data area or subcode area for each data line with a different head scanning start track, in order to know a distance from each track to a plurality of head scanning start tracks of fast-reproducing data line. For example, as shown in FIG. 13, at recording and forming a track pattern reproducing at 3- and 6-fold speeds, a normal subcode block within a subcode area sets 5 bits of a header 460 located on the first in the 19-byte data area 43, to "0", as shown in FIG. 8 (B) and FIG. 15 (A).

Figure 15:
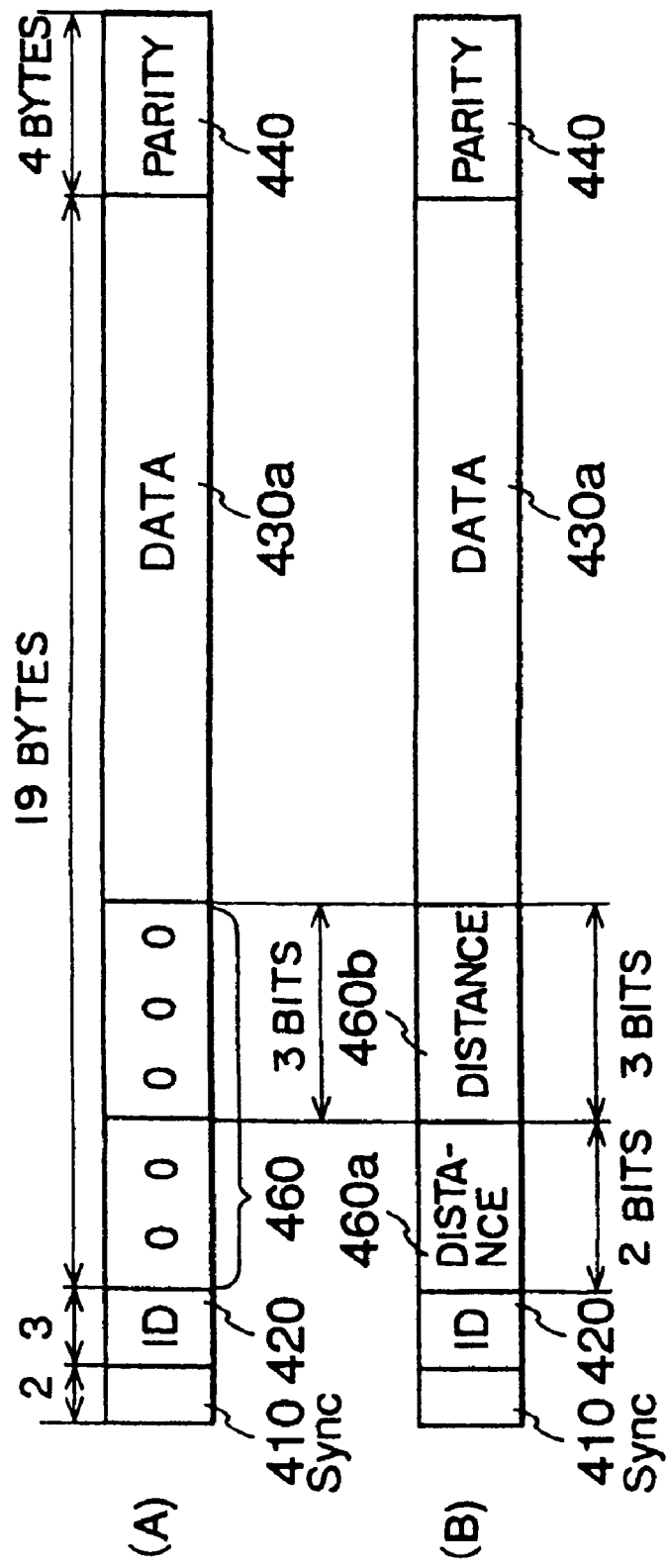
FIG. 15 is a diagram explaining another example wherein the head scanning start track information is recorded on the subcode area.

On the other hand, in the above header 460 of the first subcode block on a subcode area of a track with the same azimuth angle as a track on which fast-reproducing data is stored, as shown in FIG. 15 (B), high order 2-bit 460a is assigned as a 2-fold speed distance information area; and the rest 3-bit 460b is assigned and recorded as a 6-fold speed distance information area. 6-fold speed distance information is the same as one explained in the above methods (4) and (5). Also showing 3-fold speed distance information (2-bit value) with a track number and so on, a track with the same azimuth angle is shown in Table 6; and a track with a reverse azimuth angle, in Table 7.

TABLE 6

| Track number | Distance | Distance data | 2-bit value |
|---|---|---|---|
| 0 | 0 | 0 | 00 |
| 2 | −2 | −1 | 11 |
| 4 | +2 | 1 | 01 |
| 6 | 0 | 0 | 00 |
| 8 | −2 | −1 | 11 |

TABLE 7

| Track number | Distance | Distance data | 2-bit value |
|---|---|---|---|
| 1 | +2 | 1 | 01 |
| 3 | 0 | 0 | 00 |
| 5 | −2 | −1 | 11 |
| 7 | +2 | 1 | 01 |
| 9 | 0 | 0 | 00 |

Head scanning start phase within the 2 tracks is controlled by the predetermined optimum offset value, based on a control signal, like the method (2).

Figure 16:
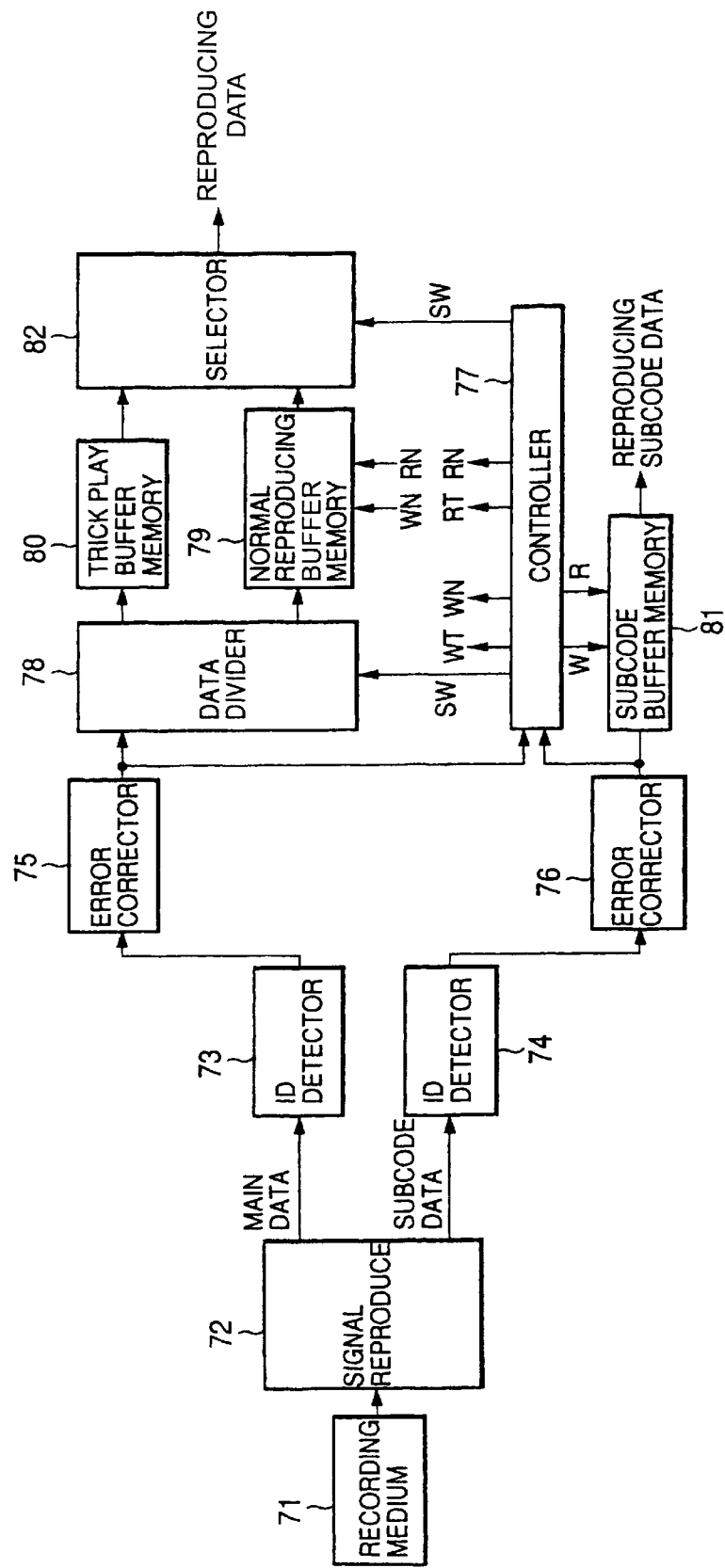
FIG. 16 is a block diagram of one embodiment of reproducing system of the digital signal recording and reproducing method and the recording and reproducing apparatus of the invention.

Then, the reproducing system of the digital signal recording and reproducing method as well as the recording and reproducing apparatus of the invention, is explained. FIG. 16 shows a block diagram explaining one embodiment of the reproducing signal system of the digital signal recording and reproducing method as well as the recording and reproducing apparatus according to the invention. In the same diagram, a recording medium 71 is a tape-like magnetic recording media having a track pattern such as FIG. 10 like the recording medium 113 (FIG. 9). At normal reproduction, the medium is run at the same constant speed as that of recording; and at fast reproduction, is run faster than normal reproduction. The existing recording digital signal on the recording medium 71 is reproduced by a reproducing mechanism including a known rotating head, and then, is amplified and demodulated by a signal reproducing circuit 72. The digital signal (subcode data) reproduced from the main data area 31 and the subcode area 27 shown in FIG. 3, is supplied to an ID detecting circuit 74 to detect address information (ID), respectively.

Based on the detected ID, the ID detecting circuits 73 and 74 supply separately a reproducing digital signal from the data area 330 and error correcting code area 340 in FIG. 8 (A), and a reproducing digital signal from the data area 430 and error correcting code area 440 in FIG. 8 (B), to error correcting circuits 75 and 76.

The reproducing digital signal (main data) error-corrected by the error correcting circuit 75, is supplied to a control circuit 77, and to a data dividing circuit 78. Also the reproducing digital signal (subcode data) supplied to the error correcting circuit 76, is error-corrected, and then, is supplied to the control circuit 77 and a subcode buffer memory 81. The control circuit 77 reads a header and address information (ID) of an input reproducing digital signal, analyzes them to produce a control signal of the data dividing circuit 78, produces write control signals WT, WN, and W of a normal reproducing buffer memory 79, a trick play buffer memory 80, and the subcode buffer memory 81, analyzes 4-byte additional information (additional header) in the reproducing digital signal, refers to data arrival time, and produces read control signals RT, RN, and R so that data is read with the same timing.

When the input reproducing digital signal is special reproducing data based on the above control signal, the data dividing circuit 78 divides and supplies the signal into the buffer memory 80. When the signal is normal reproducing data, the circuit supplies the signal into the normal reproducing buffer memory 79. Still, for a multiple kind special reproducing data, the buffer memory 80 is provided dedicatedly for each kind.

The special reproducing data stored in the buffer memory 80 and normal reproducing data stored in the buffer memory 79 are read, based on the read control signals RT and RN from the control circuit 77, and are inputted to a selecting circuit 82. The selecting circuit 82 selects one kind of data specified by the control circuit 77 to output as reproducing data. On the other hand, the read control signal R is supplied to the subcode buffer memory 81 from the control circuit 77, outputting reproducing subcode data from the buffer memory 81.

Figure 17:
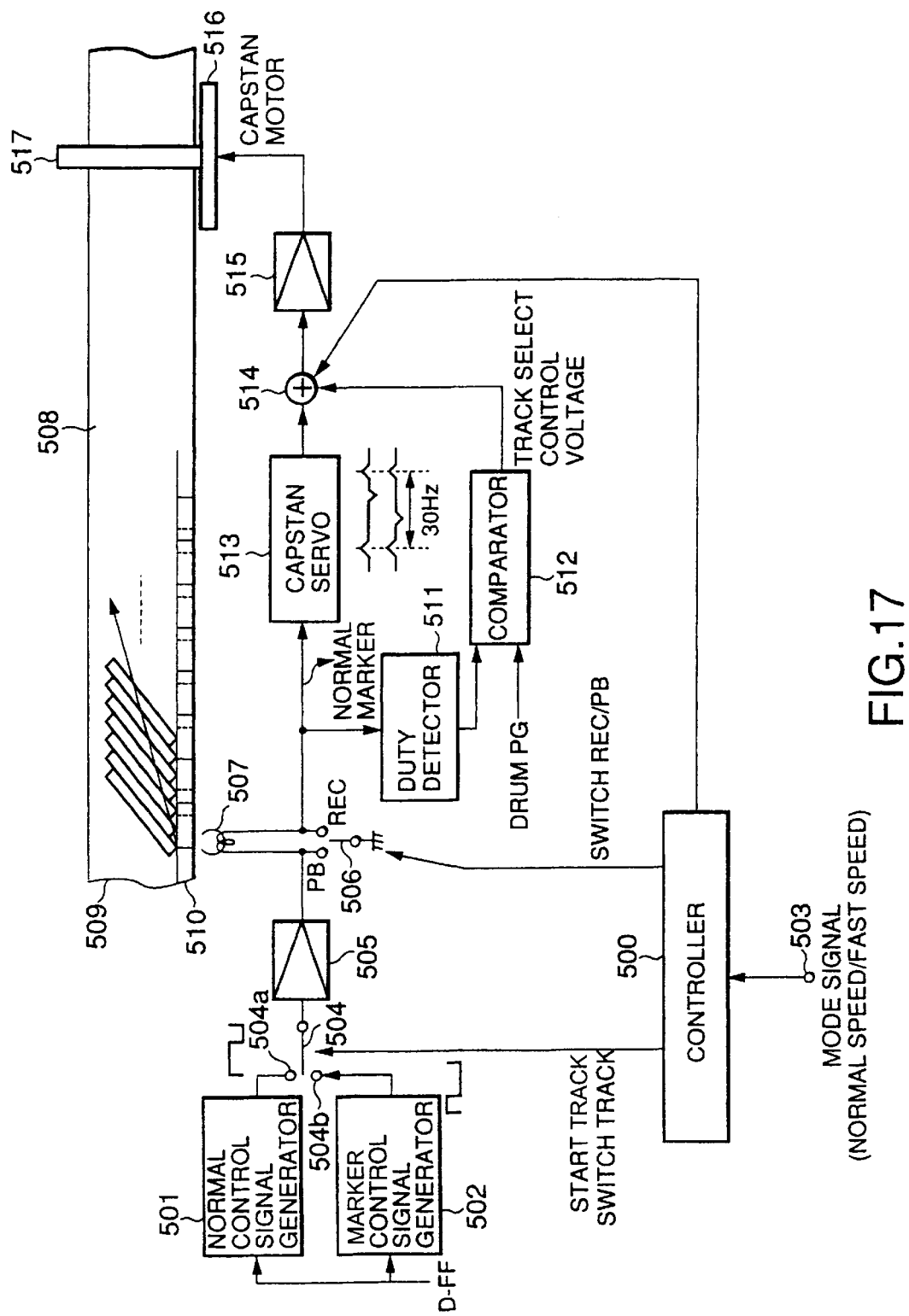
FIG. 17 is a block diagram of one embodiment of servo system of the digital signal recording and reproducing apparatus of the invention.

Then, the structure and operation of servo system are explained. FIG. 17 shows a block diagram of one embodiment of servo system of the digital signal recording and reproducing apparatus of the invention. The embodiment uses a control track to identify a fast-reproducing head scanning start track. A control circuit 500 in FIG. 17 is the same control circuit as the control circuit 77 in FIG. 16. A mode signal of normal speed or fast speed is inputted to the circuit through a terminal 503. According to the mode signal, the circuit produces a switching signal for switching and controlling a switch 504, and generates a recording/ reproducing switching signal to switch and control a switch 506.

At recording, the switch 506 is connected to terminal REC side to ground a capstan servo 513 side terminal of a control head 507. At recording, this inputs a drum flip flop (D-FF) that is a rectangular wave phase-synchronized with rotation of a rotating head refined with a known method, to a normal control signal generating circuit 501 and a marker control signal generating circuit 502 for generation, wherein, e.g. the period is the same 2 tracks (30 Hz). Either one of a first and a second rectangular waves with different duty rates is selected by the switch 504, and is supplied to a control head 507 through a recording amplifier 505 to form a control track 510 along the end portion on a magnetic tape 508 to be recorded.

The magnetic tape 508 is equivalent to the recording medium 113 (FIG. 9) and 71 (FIG. 16). On a record range 509 on a magnetic tape other than the control track 510, the tape forms sequentially a track tilted against the longitudinal direction of the tape by an unillustrated rotating head, to record a sequentially synthesized signal of said normal reproducing data and special reproducing data. This recording and reproducing mechanism is known and has no relation to the summary of the invention; therefore the detailed explanation is omitted. Still, the slant arrow described on the magnetic tape 508 shows one example of a rotating head scanning track at fast reproduction.

In general, the control circuit 500 connects the switch 504 to a terminal 504*a* side, and selects a normal control signal of a first duty rate (said first rectangular wave) to be recorded on the control track 510. For a control signal recorded at a location corresponding to a fast-reproducing scanning start track, the circuit 500 connects and switches the switch 504 to a terminal 504*b* side, and selects a marker control signal of a second duty rate (said second rectangular wave) to be recorded on the control track 510. This forms a track pattern as shown in FIG. 11 on the magnetic tape 508.

At reproduction, the control circuit 500 switches and connects the switch 506 to a terminal PB side, inhibiting a control signal recording system, and supplies a control signal reproduced from the control track 510 by the control head 507 to a duty rate detecting circuit 511 and the capstan servo 513, respectively.

The duty rate detecting circuit 511 detects whether the duty rate of the generated control signal is said first duty rate or said second duty rate, and compares the detected result with a drum pulse generator (PG) generated by a known method in a comparator 512. The comparator 512 outputs track select control voltage based on this compared result to supply to an adder 514, and adds the output signal of the capstan servo 513 and the offset voltage from the control circuit 500 as described later.

The output signal of the adder 514 is amplified by a capstan motor drive amplifier (MDA) 515, and then is supplied to a capstan motor 516 to control the rotation. This controls the running speed and phase of the magnetic tape pinched and run by a capstan 517 and a pinch roller (unillustrated).

When the marker control signal reproduced by the control head 507 is detected, an optimum tape phase is not always obtained depending on the tape running speed at that time; therefore, the phase within the two tracks is controlled with the capstan servo 513 so as to be an optimum tape phase for the speed. In that case, since an optimum head scanning start phase for the control signal depending on the reproducing speed may be different, the control circuit 500 outputs offset voltage for changing the amount of offset (the predetermined value) depending on the reproducing speed, to the adder 514. When the amount of the offset by this offset voltage, e.g. at normal reproduction is "0," it is "−0.5" at 6-fold speed reproduction. Still, the amount of the offset for one track is "1".

Figure 18:
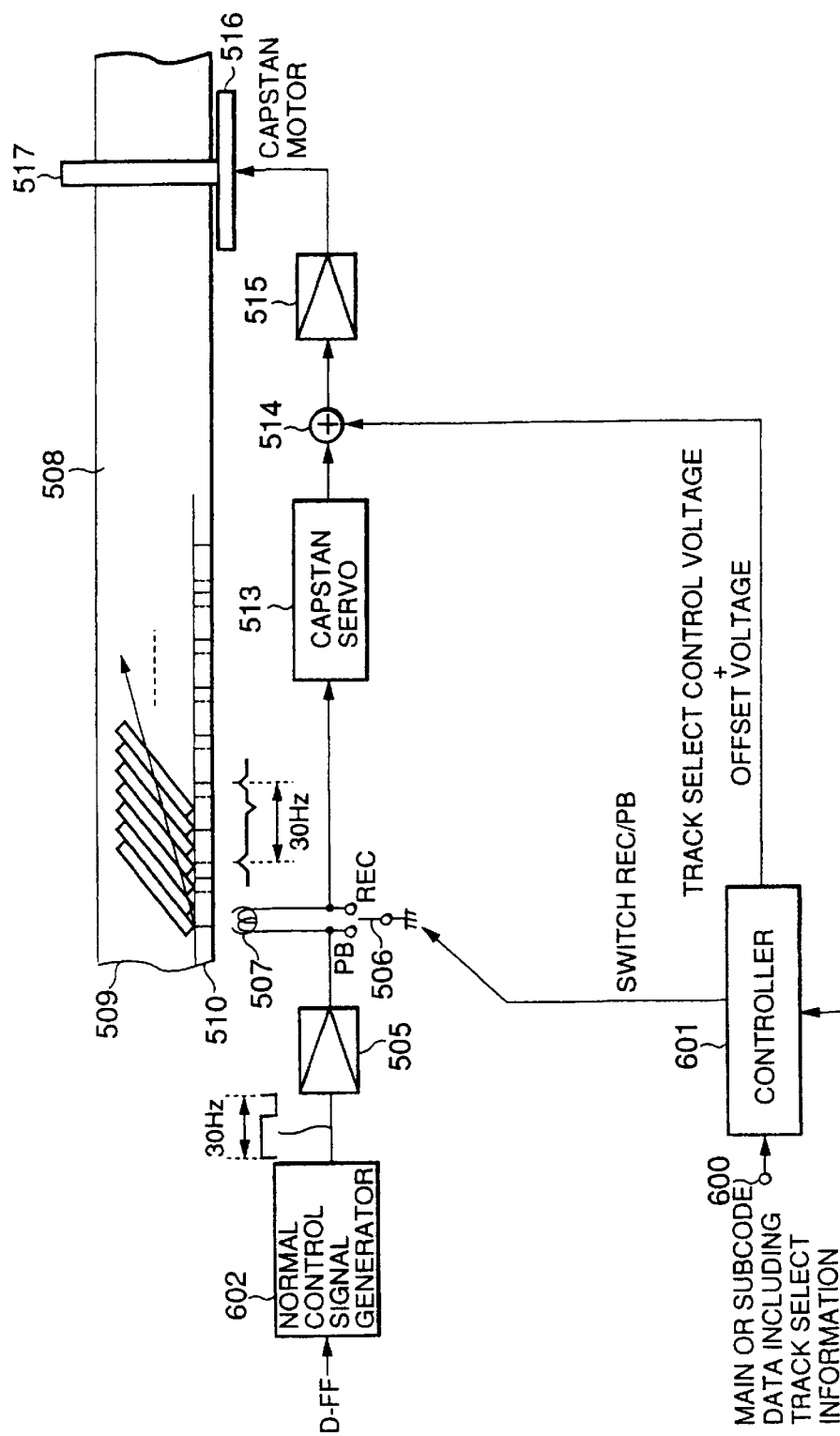
FIG. 18 is a block diagram of another embodiment of servo system of the digital signal recording and reproducing apparatus of the invention.

Then, another embodiment of the servo system of the digital signal recording and reproducing apparatus of the invention, is explained. FIG. 18 shows a block diagram of another embodiment of the servo system of the digital signal recording and reproducing apparatus of the invention. In the same diagram, the same sign is designated for the same structure portion as FIG. 17; and the explanation is omitted.

In the embodiment, records and reproduces head scanning start track information (track select information) is recorded on and reproduced from a subcode area or main data area of a tilted track by way of the methods (2) to (6) described above, so as to identify a fast-reproducing head scanning start track.

A control circuit 601 in FIG. 18 in which the main data and subcode data taken from the error correcting circuits 75 and 76 shown in FIG. 16 are inputted through a terminal 600, reads track select information, and produces track select voltage and offset voltage according to the information, to output to the adder 514.

This allows the control circuit 601, e.g. to extract the distance data shown in Tables 4 to 7 from subcode data or main data. When a positive distance data is obtained, the tape running speed is increased; when a negative distance data is obtained, the tape running speed is reduced.

Thus fast reproduction can quickly be started from a head scanning start track.

In the embodiment, the control signal recorded and reproduced by the control head 507 is a constant duty rate rectangular wave with a uniform period generated by a control signal generating circuit 602.

The invention is not restrictive of the above embodiments, and may have three kinds or more fast-reproducing data. Also fast-reproducing data is not limited to generation from normal reproducing data, and may separately be generated to be inputted to the recording apparatus with normal reproducing data. In addition, to record marker information on a controller track, the duty rate of a control signal may be changed; and a pulse with a pulse width extremely shorter than the control signal may be recorded.

Further, a mode recording only a data line that can generate only for a certain speed and a certain head scanning track of fast-reproducing data, is provided so as to select either one at recording. A user may externally specify this selecting means with a switch, or may automatically switch it according to the data rate of normal reproducing data.

FIELD OF INDUSTRIAL UTILIZATION

As explained above, according to the recording method of the invention, the percentage of the recorded data amount of a special reproducing digital signal and the data amount of a normal reproducing digital signal against the information amount of all data areas is changed according to the data rate of the normal reproducing digital signal, so that the percentage of the special reproducing data and normal reproducing data can efficiently be set and recorded, according to the data rate of the normal reproducing digital signal; and the recorded amount of the normal reproducing data can be prevented from being limited by the special reproducing data.

As explained above, according to the digital signal recording and reproducing method of the invention, special reproduction can be made according to on the data rate of a normal reproducing digital signal, so that a small data amount of the normal reproducing digital signal can make quickly phase lock fast reproduction; even a large data amount of the normal reproducing digital signal can achieve track select fast reproduction while reserving the data amount of the normal reproducing digital signal; further neither a small nor a large data amount of the normal reproducing digital signal can achieve fast reproduction by track select with a multiple kind 2-fold speed rate.

Also according to the digital signal recording and reproducing method of the invention, a multiple kind special reproducing head scanning start track location can clearly be identified at reproduction by marker information, so that a given 2-fold speed rate fast reproduction of fast reproduction by track select with a multiple kind 2-fold speed rate can be selected and be exactly performed.

Also according to the invention, marker information having distance information showing the number of tracks up to a special reproducing head scanning start track is recorded, on a particular data block within a track for each predetermined track period; and how many tracks a currently scanning track is away from a track to be originally scanned is determined at reproducing the marker information, so that the special reproducing head scanning start phase is controlled with this marker information to reduce fast-reproducing lockin time.

Also according to the digital signal recording apparatus of the invention, a normal reproducing digital signal or a special reproducing digital signal is selected and recorded, only on the record area of the predetermined particular multiple kind special reproducing digital signal on a tape-like recording medium, depending on the data rate of the normal reproducing digital signal; and a circuit (such as addressing) for locating the special reproducing digital signal is needed not be switched, so that the burden of the circuit can largely be reduced.

Also according to the recording and reproducing apparatus of the invention, the recorded and placed location of a special reproducing digital signal mixed in a normal reproducing digital signal to be recorded is limited to record the normal reproducing digital signal on a tape-like recording medium by a rotating head, according to the data rate of the normal reproducing digital signal so that at special reproduction the special reproducing digital signal can exactly be reproduced based on marker information. Also a fast-reproducing digital signal limited according to the data rate of the normal reproducing digital signal is not data that is generated for that, but a conventional fast-reproducing digital signal itself (or portion of it), can use a circuit generating the conventional fast-reproducing digital signal, just as it is, preventing the complexity of the circuit structure.

Also according to the recording medium of the invention, a header having map information showing a pattern in which a multiple kind special reproducing digital signal is placed and recorded, and information for identifying which of a special reproducing digital signal or a normal reproducing digital signal is selected and recorded on the predetermined particular area is recorded, so that the required kind of special reproducing digital signal can be reproduced quickly at special reproduction.

Also according to the recording medium of the invention, special reproduction can be realized, if either one of a plurality of data blocks of two special reproducing digital signals recorded by duplicating with a plurality of data blocks of a special reproducing digital signal recorded only once in the reproducing apparatus, can be reproduced, so that an allowance for the rotating head tracking accuracy at compatible reproduction and special reproduction can be reserved (the flexibility of a head scanning track can be increased).

Also according to the recording medium of the invention, a first and a second track patterns are mixed and formed in accordance with the data rate of a normal reproducing digital signal, so that either one of normal reproduction by normal reproducing digital signal reproduction or special reproduction by special reproducing digital signal reproduction can naturally be selected and performed; and the special reproduction can be made while reserving the recorded data amount of the normal reproducing digital signal.

What is claimed is:

1. A digital signal recording method for recording sequentially a normal speed reproducing digital signal and multiple kind special speed reproducing digital signals corresponding to said normal speed reproducing digital signal on a tape-like recording medium, comprising the steps of:

detecting a data rate of said normal speed reproducing digital signal;

selecting, according to said data rate of said normal speed reproducing digital signal, either said normal speed reproducing digital signal or a special speed reproducing digital signal of low priority in reproduction of said special speed reproducing digital signals; and recording said selected digital signal at a predetermined location on said tape-like recording medium for recording said special speed reproducing digital signals.

2. The digital signal recording method of claim 1 wherein said multiple kind special speed reproducing digital signals are generated based on said normal speed reproducing digital signal.

3. The digital signal recording method of claim 1 wherein if said data rate exceeds a desired value, said normal speed reproducing digital signal is selected.

4. The digital signal recording method of claim 1, further comprising the steps of:

arranging sequentially at least one kind of special speed reproducing digital signal, of said multiple kind special speed reproducing digital signals, in the order of a first signal component, a second signal component, and a third signal component that is the same as said first signal component;

selecting, according to said data rate, either of said normal speed reproducing digital signal or said one kind of special speed reproducing digital signals; and recording said selected normal speed reproducing digital signal at the predetermined location on said tape-like recording medium for recording one or both of said first signal component and said third signal component, when said normal speed reproducing digital signal is selected.

5. The digital signal recording method of claim 1 wherein an information signal showing which of said normal speed reproducing digital signal or said special speed reproducing digital signal is selected, is added to said selected digital signal.

6. The digital signal recording method of claim 1 wherein a digital signal to be reproduced at a desired reproducing speed is recorded repeatedly a desired number of times, at desired intervals at the predetermined location on said tape-like recording medium, when said digital signal to be reproduced at the predetermined reproducing speed, of said multiple kind special speed reproducing digital signals is selected.

7. The digital signal recording method of claim 6 wherein an information signal, showing the reproduced start location of said digital signal to be reproduced at the desired reproducing speed, is recorded at the predetermined location in relation to a location at which said digital signal to be reproduced at the desired reproducing speed is recorded repeatedly.

8. The digital signal recording method of claim 7 wherein a duty rate of a first control signal, recorded on a track corresponding to the track on which said digital signal to be reproduced at the desired reproducing speed is recorded, is differentiated from a duty rate of a second control signal recorded on a track corresponding to the track on which a digital signal other than said digital signal to be reproduced at the desired reproducing speed is recorded, said first control signal being recorded as said information signal.

9. The digital signal recording method of claim 7 wherein said information signal is recorded on a desired area on the track on which said digital signal to be reproduced at the desired reproducing speed is recorded.

10. A digital signal recording and reproducing method recording and reproducing sequentially a normal speed reproducing digital signal and multiple kind special speed reproducing digital signals corresponding to said normal speed reproducing digital signal on a tape-like recording medium, comprising the steps of:

detecting a data rate of said normal speed reproducing digital signal;

selecting, according to said data rate of said normal speed reproducing digital signal, either said normal speed reproducing digital signal or a special speed reproducing digital signal of low priority in reproduction of said special speed reproducing digital signals;

recording said selected digital signal on a predetermined location on said tape-like recording medium for recording said special speed reproducing digital signals;

reproducing said sequentially recorded digital signals;

detecting each of said reproduced digital signals as either said normal speed reproducing digital signal or at least one of said multiple kind special speed reproducing digital signals; and outputting separately said digital signals detected as either of said reproduced digital signals.

11. The digital signal recording and reproducing method of claim 10 wherein a digital signal to be reproduced at a desired reproducing speed is recorded repeatedly a desired number of times, at desired intervals at the predetermined location on said tape-like recording medium, when said digital signal to be reproduced at the desired reproducing speed, of said multiple kind special speed reproducing digital signals is selected.

12. The digital signal recording and reproducing method of claim 11 wherein an information signal, showing a reproduced start location of said digital signal to be reproduced at the desired reproducing speed, is recorded at the predetermined location in relation to a location at which said digital signal to be reproduced at the desired reproducing speed is recorded repeatedly.

13. The digital signal recording and reproducing method of claim 12 wherein said information signal is recorded on a desired area on the track on said tape-like recording medium on which said digital signal to be reproduced at the desired reproducing speed is recorded.

14. The digital signal recording and reproducing method of claim 13 wherein said information signal recorded on said desired area shows what said desired reproducing speed is.

15. The digital signal recording and reproducing method of claim 14, further comprising the steps of:

generating a first control signal and a second control signal with a duty rate different from that of said first control signal;

recording said first control signal as said information signal on a track corresponding to the track on said tape-like recording medium on which said digital signal to be reproduced at the desired reproducing speed is recorded; and recording said second control signal on a track corresponding to the track on said tape-like recording medium on which a digital signal other than said digital signal to be reproduced at the desired reproducing speed is recorded.

16. A digital signal recording and reproducing method of claim 15, further comprising the steps of:

detecting a control signal from said reproduced sequentially recorded digital signal;

determining said detected control signal is either said first control signal or said second control signal;

generating a first control voltage for reproducing at said desired reproducing speed, when said first control signal is determined;

generating a second control voltage for obtaining a phase at running of said tape-like recording medium best-suited to said desired reproducing speed; and reproducing said digital signal to be reproduced at the desired reproducing speed.

17. The digital signal recording and reproducing method of claim 11 wherein an information signal showing a distance from each location on said tape-like recording medium on which said normal speed reproducing digital signal and said multiple kind special speed reproducing digital signals are recorded on a desired area on the track on said tape-like recording medium including said digital signal to be reproduced at the desired reproducing speed, to a reproduced start location of said repeatedly recorded digital signal to be reproduced at the desired reproducing speed, is recorded.

18. A digital signal recording apparatus for recording sequentially a normal speed reproducing digital signal and multiple kind special speed reproducing digital signals corresponding to said normal speed reproducing digital signal on a tape-like recording medium, comprising:

detecting means for detecting a data rate of said normal speed reproducing digital signal;

selecting means for selecting, according to said data rate of said normal speed reproducing digital signal, either of said normal speed reproducing digital signal or a special speed reproducing digital signal of low priority in reproduction of said special speed reproducing digital signals; and recording means for recording said selected digital signal at a predetermined location on said tape-like recording medium for recording said special speed reproducing digital signals.

19. The digital signal recording apparatus of claim 18 further comprising generating means for generating said multiple kind special speed reproducing digital signals based on said normal speed reproducing digital signal.

20. The digital signal recording apparatus of claim 19 wherein:

said generating means arranges sequentially at least one kind of special speed reproducing digital signal, of said multiple kind special speed reproducing digital signals, in an order of a first signal component, a second signal component, and a third signal component that is the same as said first signal component;

said selecting means selects, according to said data rate, either of said normal speed reproducing digital signal or said one kind of special speed reproducing digital signal; and said recording means records said normal speed reproducing digital signal at the predetermined location on said tape-like recording medium for recording one or both of said first signal component and said third signal component, when said normal speed reproducing digital signal is selected.

21. The digital signal recording apparatus of claim 18 wherein, when said data rate exceeds a desired value, said selecting means selects said normal speed reproducing digital signal.

22. The digital signal recording apparatus of claim 18 comprising signal adding means for adding an information signal, showing the predetermined location on said tape-like recording medium for recording said special reproducing digital signal, to said selected digital signal.

23. The digital signal recording apparatus of claim 18 further comprising signal adding means for adding an information signal showing either of said normal speed reproducing digital signal or said special speed reproducing digital signal as selected, to said selected digital signal.

24. The digital signal recording apparatus of claim 18 wherein said recording means records repeatedly a desired number of times a digital signal to be reproduced at the desired reproducing speed, at desired intervals at the predetermined location on said tape-like recording medium, when said digital signal to be reproduced at the desired reproducing speed, of said multiple kind special speed reproducing digital signals is selected.

25. A digital signal recording and reproducing apparatus recording and reproducing sequentially a normal speed reproducing digital signal and multiple kind special speed reproducing digital signals corresponding to said normal speed reproducing digital signal on and from a tape-like recording medium, comprising:

detecting means for detecting a data rate of said normal speed reproducing digital signal;

selecting means for selecting, according to said data rate of said normal speed reproducing signal, either of said normal speed reproducing digital signal or a special speed reproducing digital signal of low priority in reproduction of said special speed reproducing digital signals;

recording means for recording said selected digital signal at a predetermined location on said tape-like recording medium for recording said special speed reproducing digital signals;

reproducing means for reproducing sequentially recorded digital signals;

detecting means for detecting each of said reproduced digital signals as either said normal speed reproducing digital signal or said special speed reproducing digital signal; and outputting means for outputting separately the digital signal detected as either of said reproduced digital signals.

26. The digital signal recording and reproducing apparatus of claim 25 wherein said recording means records repeatedly a desired number of times a digital signal to be reproduced at the desired reproducing speed, at desired intervals at the predetermined location on said tape-like recording medium, when said digital signal to be reproduced at the desired reproducing speed, of said multiple kind special speed reproducing digital signals is selected.

27. The digital signal recording and reproducing apparatus of claim 26 wherein said recording means records an information signal showing a reproduced start location of said digital signal to be reproduced at the desired reproducing speed, at the predetermined location in relation to a location at which said digital signal to be reproduced at the desired reproducing speed is recorded repeatedly.

28. The digital signal recording and reproducing apparatus of claim 27 wherein said recording means records said information signal on a desired area on the track on said tape-like recording medium on which said digital signal to be reproduced at the desired reproducing speed is recorded.

29. The digital signal recording and reproducing apparatus of claim 28 wherein said information signal recorded on said desired area shows what said desired reproducing speed is.

30. The digital signal recording and reproducing apparatus of claim 29 further comprising:

means for generating a first control signal and a second control signal with a duty rate different from that of said first control signal;

wherein said recording means records, as said information signal, said first control signal on a track corresponding to the track on which said digital signal to be reproduced at the desired reproducing speed is recorded, and records said second control signal on a track corresponding to the track on said tape-like recording medium on which a digital signal other than said digital signal to be reproduced at the desired reproducing speed is recorded.

31. The digital signal recording and reproducing apparatus of claim 30, further comprising:

detecting means for detecting a control signal from said reproduced sequential digital signal;

determining means for determining said detected control signal is either said first control signal or said second control signal;

first generating means for generating a first control voltage for reproducing at said desired reproducing speed, when said first control signal is determined; and second generating means for generating a second control voltage for obtaining a phase at running of said tape-like recording medium best-suited to said desired reproducing speed;

wherein said reproducing means reproduces said digital signal to be reproduced at the desired reproducing speed.

32. The digital signal recording and reproducing apparatus of claim 28 wherein said recording means records an information signal showing a distance from each location on said tape-like recording medium on which said normal speed reproducing digital signal and said multiple kind special speed reproducing digital signals are recorded on the desired area on said track including said digital signal to be reproduced at the desired reproducing speed, to the reproduced start location of said repeatedly recorded digital signal to be reproduced at the desired reproducing speed.

33. The digital signal recording and reproducing apparatus of claim 32 wherein said reproducing means detects said information signal from said reproduced sequential digital signal, and changes a running speed of said tape-like recording medium, according to a distance from each location on said tape-like recording medium on which said normal speed reproducing digital signal and said multiple kind special speed reproducing digital signals, indicated by said detected information signal, are recorded, to the reproduced start location of said digital signal to be reproduced at the desired reproducing speed.

* * * * *